United States Patent [19]

Budde et al.

[11] 4,438,494
[45] Mar. 20, 1984

[54] APPARATUS OF FAULT-HANDLING IN A MULTIPROCESSING SYSTEM

[75] Inventors: David L. Budde, Portland; David G. Carson, Hillsboro, both of Oreg.; Anthony L. Cornish, Essex, England; Brad W. Hosler; David B. Johnson, both of Portland, Oreg.; Craig B. Peterson, Portland, Oreg.

[73] Assignee: Intel Corporation, Santa Clara, Calif.

[21] Appl. No.: 296,025

[22] Filed: Aug. 25, 1981

[51] Int. Cl.³ .............................................. G06F 11/00
[52] U.S. Cl. ...................................... 364/200; 371/11
[58] Field of Search .................. 364/200, 900; 371/11

[56] References Cited

U.S. PATENT DOCUMENTS

| | | | |
|---|---|---|---|
| 3,984,819 | 10/1976 | Anderson | 364/200 |
| 4,123,794 | 10/1978 | Matsumoto | 364/200 |
| 4,228,496 | 10/1980 | Katzman | 371/11 |
| 4,247,892 | 1/1981 | Lawrence | 364/200 |
| 4,270,169 | 5/1981 | Flunt | 364/200 |
| 4,270,170 | 5/1981 | Reddaway | 364/200 |

FOREIGN PATENT DOCUMENTS 55-110320  8/1980  Japan ..................................... 371/11

*Primary Examiner*—Jerry Smith
*Assistant Examiner*—Michael R. Fleming
*Attorney, Agent, or Firm*—Owen L. Lamb

[57] ABSTRACT

A number of intelligent crossbar switches (100) are provided in a matrix of orthogonal lines interconnecting processor (110) and memory control unit (MCU) modules (112). The matrix is composed of processor buses (105) and corresponding error-reporting lines (106); and memory buses (107) with corresponding error-reporting lines (108). At the intersection of these lines is a crossbar switch node (100). The crossbar switches function to pass memory requests from a processor to a memory module attached to an MCU node and to pass any data associated with the requests. The system is organized into confinement areas at the boundaries of which are positioned error-detection mechanisms to deal with information flow occurring across area boundaries. Each crossbar switch and MCU node has means for the logging and signaling of errors to other nodes. Means are provided to reconfigure the system to reroute traffic around the confinement area at fault and for restarting system operation in a possibly degraded mode.

10 Claims, 17 Drawing Figures

GDP CONFINEMENT AREA

IP CONFINEMENT AREA

MEMORY CONFINEMENT AREA

MACD BUS CONFINEMENT AREA

APPARATUS OF FAULT-HANDLING IN A MULTIPROCESSING SYSTEM

BACKGROUND OF THE INVENTION

1. Field of Invention

This invention relates to multiprocessing systems and more particularly to means for interconnecting data processor modules with memory modules including means for handling faulty units such that the system can continue to operate in the presence of permanent errors.

2. Description of the Prior Art

With the advent of very large-scale integrated circuit (VLSI) technology, there has arisen a corresponding need for new fault-handling methods and apparatus. With the capability of placing a very large number of circuits in increasingly smaller areas, it has become necessary to provide comprehensive and complete fault covererage of the circuits. This means that errors must be confined and isolated to small logic blocks. In order to take the fullest advantage of VLSI technology, it is desirable that integrated circuit chips be identical and that they provide for modular interconnections. In these types of systems, most fault occurrences are independent, and two or more faults do not usually occur simultaneously. However, since there are possibly latent faults present in the system, means must be provided for handling a second fault which occurs in addition to the latent fault. Transient errors are the dominant type of fault occurrence.

It is further desirable that the propagation of errors between levels should be minimized to prevent information overload at higher levels in the system structure. The detection and recovery mechanisms should address every level of the system to provide a complete solution to the handling of system failures. This allows the fault-handling apparatus to be distributed since each level need address only the set of faults that can be generated at that level.

It is therefore a primary object of this invention to provide a modular, distributed-function, fault-handling mechanism for the detection, reporting, and recovery of transient, latent, and permanent errors.

SUMMARY OF THE INVENTION

Briefly, the above objects are accomplished in accordance with the invention by providing an error-reporting matrix including horizontal bus error-report lines and vertical module error-report lines which are interconnected to follow the same topology as the switching matrix which interconnects data processing modules and memory modules. Error-reporting means are connected at nodes at the intersection of the bus error-report lines and module error-report lines. The error-reporting means includes means for receiving error messages transmitted to it over the error-report lines. Means are provided for propagating error messages over the error-report lines to other reporting means located at other nodes in the matrix. In this manner every node is made aware of an error reported to any one node.

In accordance with an aspect of the invention, once an identification is made of which bus or processor module is faulty, retry, or deactivation of the bus and rerouting of traffic to by-pass the module, and termination of process execution on a by-passed processor module may be carried out.

In accordance with a further aspect of the invention, redundant memory buses, processor modules, and memory modules to support system reconfiguration are provided. A memory control unit is provided with means to connect into a second memory bus different from its usual memory bus when an error condition exists. In this manner processor requests to the memory are re-routed around the faulty bus.

The foregoing and other objects, features, and advantages of the invention will be apparent from the following detailed description of a preferred embodiment of the invention as illustrated in the accompanying drawings wherein:

BRIEF DESCRIPTION OF THE DRAWINGS

FIG. 10 is a more detailed diagram of the crosspoint switch shown in FIG. 1;

FIG. 11 is a more detailed diagram of the fault-handling machine of the crosspoint switch shown in FIG. 10;

FIG. 12 is a flow diagram of the system recovery method for the data processing system of FIG. 1;

FIG. 13 is a state diagram of the recovery machine portion of the fault-handling machine shown in FIG. 11;

FIG. 14 is a state diagram of the receiver portion of the fault-handling machine shown in FIG. 11;

FIG. 15 is a state diagram of the generator portion of the fault-handling machine shown in FIG. 11;

FIG. 16 is a state diagram of the propagator portion of the fault-handling machine shown in FIG. 11; and, FIG. 17 is a state diagram of the logger portion of the fault-handling machine shown in FIG. 11.

DETAILED DESCRIPTION

Figure 1:
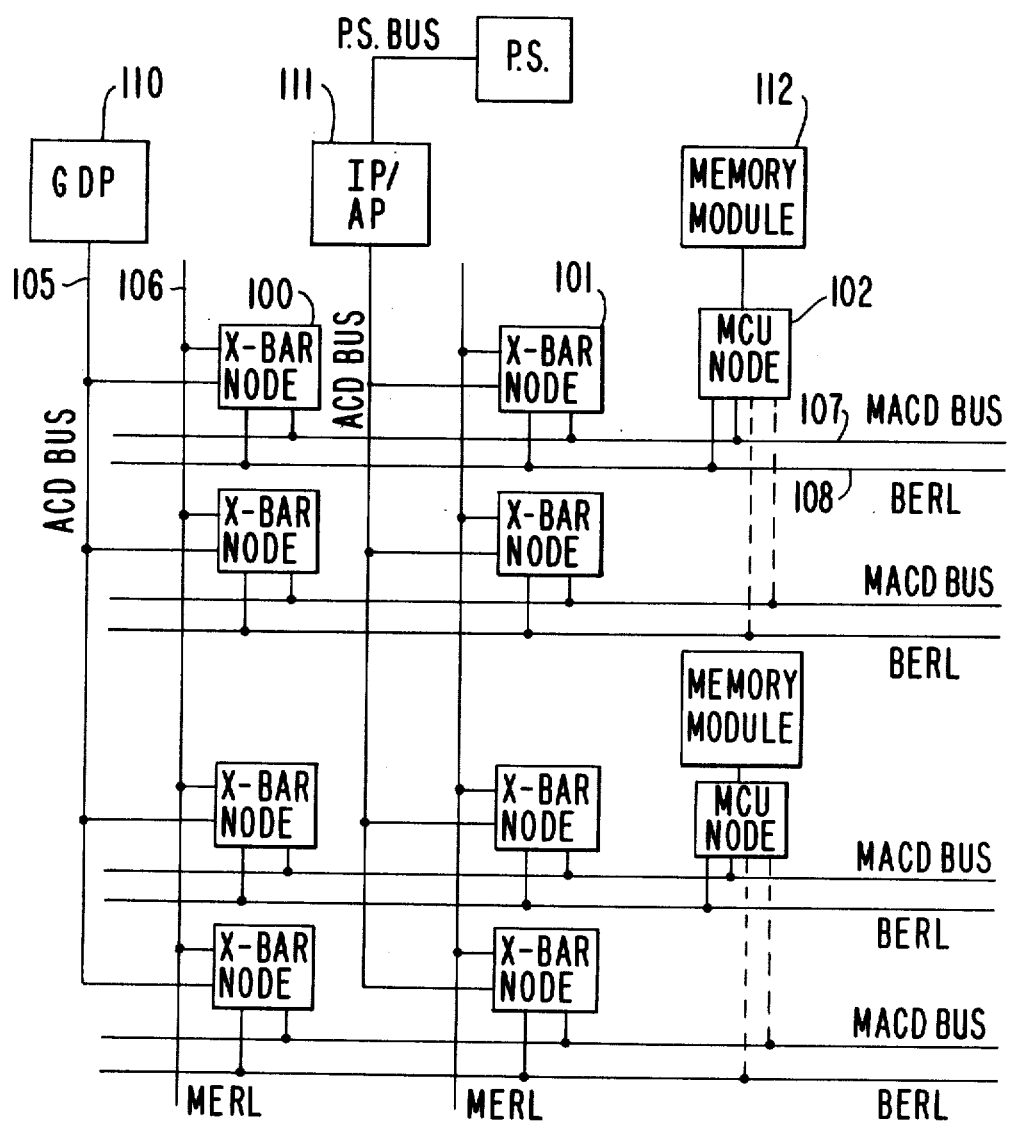
FIG. 1 is a diagram of a data processing system in which the switching mechanism of the present invention is embodied.

FIG. 1 is a diagram of a data processing system in which the switching mechanism of the present invention is embodied. The switching mechanism provides data processors with connection and access capability to a main memory. The interconnect mechanism is comprised of two Very Large-Scale Integrated-circuit (VLSI) chips. One chip is a crosspoint switch (X-bar-100), and the other chip is a memory control unit (MCU-102).

The interconnect mechanism is a system of orthogonal lines arranged in a matrix as shown in FIG. 1. This matrix is composed of processor buses (ACD) and corresponding error-reporting lines (MERLs 105, 106), and memory buses (MACD) and corresponding error-reporting lines (BERLs 107, 108). At the intersection of these lines there is a crossbar switch (100). The crossbar switch responds to access requests from a processor (110) received over the processor bus, and switches them onto the appropriate memory bus for distribution to the correct segment of the address space in a memory module (112). Similarly, replies from a memory module are routed onto the memory bus where the appropriate crossbar switch selects and switches the data onto the processor bus in correct sequence.

Each processor bus supports one Generalized Data Processor (GDP, 110) or one I/O Processor/Attached Processor (IP/AP) pair (111). The processor bus is a synchronous, multiplexed, bidirectional, 16-bit bus. This bus makes connection to the interconnect on the processor side of the crossbar (100). The processor bus is described in detail in U.S. Pat. No. 4,315,308 entitled "Interface Between A Microprocessor Chip and Peripheral Subsystems," of Daniel K. Jackson, granted on Feb. 9, 1982 to Intel Corporation, the assignee of the present application. The GDP is described in detail in U.S. Pat. No. 4,325,120 entitled "Data Processing System," of Stephen Colley, et al., granted on Apr. 13, 1982 to Intel Corporation, the assignee of the present application. The IP is described in detail in U.S. Pat. No. 4,315,310 entitled "Input/Output Data Processing System," of John A. Bayliss, et al., granted on Feb. 9, 1982 to Intel Corporation, the assignee of the present application.

Each memory bus supports one or more memory modules (112). Each memory module is connected to the memory bus through a Memory Control Unit (MCU, 102). The MCU works together with the crossbar in routing accesses. Each MCU controls a single 256Kbyte (or 1 Mbyte in the case of 256K RAM parts) dynamic memory array. As access requests are passed along the memory bus, the MCU selects and responds to those requests directed within the address space of its array.

Since GDP processors make variable-length accesses on any byte boundary, single accesses will sometimes span two memory buses. A time ordered memory bus arbitration scheme described subsequently guarantees access indivisibility.

Each MCU in the system logically attaches to one of the memory buses (MACD) and controls a single four-byte-wide array of memory.

The memory interface generated by the MCU drives a single 40-bit array (includes 7 ECC bits and a spare) of memory (256Kbytes using 64K RAM parts). The memory interface contains the following signals:
  20-bit multiplexed address and data (latches are provided next to the array to latch and multiplex the address for multiplexing from/to the 20-bit bus)
  RAS, CAS (dynamic RAM timing)
  DEIN
  Address Mux (selects row or column address in an external address multiplexer)
  Refresh
  Write Enable (timed for dynamic RAM read-modify-write)

Since the interconnect provides for a distributed control memory architecture, any number of memory modules (within design constriction limits) may be attached to a single-memory bus. For example, each memory module may be 32 bits (plus ECC) wide by 16Kbits (partial 64K) to 1 Mbits deep, depending on the memory device used. These modules can be logically arranged in any combination of two basic ways.
  No interleaving: each memory module in the system responds independently to one contiguous subrange of the available processor physical address space. Under this configuration, when an access is split across two memory modules, each module responds independently with its portion of the access, and the crossbar performs the function of joining the several parts.
  Mid-order interleaving (two-way or four-way): two (or four) memory buses, each containing the same storage capacity are paired. The address space for these paired buses is interleaved on 64-byte or 128-byte boundaries. Mid-order interleaving is useful on medium-to-large systems to prevent a bottleneck on a single memory bus. In any configuration, accesses that span two buses are split by the crossbar into two access requests, each providing the portion of the total access which falls in the address space of the given memory bus.

The memory bus is a packet-oriented bus. A packet is an identifying "envelope" or header plus message contents (data) which provides basic communication of requests and data between MCU and crossbar. The packet bus contains twenty-one signal wires:
  MACD (15:0)=16 bits of multiplexed data, address and control
  CTL (2:0)=3 bits of packet control
  CHK (1:0)=2 bits of parity
  Transmission checking via parity on MACD and CTL bits
    byte-wide parity
    checks common bus transients; single errors, paired double errors, stuck-at errors, odd number errors, some nonpaired doubles
  Bus access arbitration via a FRFS arbitration scheme.
  Contention is resolved by fixed priority
  grantee issues packet
  Three (3) arbitration signal wires
  RQ#
    at least one request
  CONT#
    two or more requests
  NREQ#
    new processor request
  Packets
  Two (2) packet types
    Op-coded: for messages and requests
      Implicitly addressed reply: for data return
    Packet control signals allow look-ahead for bus access
    10 message types defined for communication between crossbar and MCU
    LARGE number of reserved formats for future use
  Communication protocol
  Packets issued complete; no stretch cycles
  Replies returned in order of requests
  Pipelining
    Op-coded requests may be pipelined to three levels
    All components must obey pipeline protocol
    Allows use of otherwise lost latency time of an access operation
  Bus turnaround does not occupy a separate cycle;
  Error indication
    Via MERL and BERL of fault handling Appropriate response to hardware error conditions is based upon a "confinement area" concept which partitions the interconnect system of FIG. 1 into a number of areas, shown in detail in FIGS. 2-5. At the boundaries of each area are error-detection mechanisms appropriate to deal with the kind of information flowing across the boundaries.

Provision is made for reporting (logging and signaling) of errors after detection. Once an identification is made of which bus or processor module (if any) is suspended to be faulty, deactivation of the bus (and rerouting of traffic around the bus) or deactivation of the processor module (and termination of process execution on that processor) may be carried out. Lastly, system operation may commence once again, possibly in a degraded fashion (missing a bus or module).

Detection of errors introduced by VLSI logic is accomplished by a redundancy method known as Function Redundancy Checking (FRC), in which the logic is duplicated and output signals are compared. (FRC is described in U.S. Pat. No. 4,176,258, of Daniel K. Jackson, granted to Intel Corporation of Nov. 27, 1979). Transmission errors are detected through parity checking logic which employs two checkbits on the memory bus. The interface to the memory array employs an Error Correcting Code (ECC).

Reporting mechanisms, including logs used to record information about the detected errors, are provided. Included an error signals which interconnect units in a module and those which communicate error information throughout the interconnection matrix.

Redundant memory buses and processor memory modules to support system reconfiguration are provided. Memory bus "switching" is supported by providing the MCU with the means to connect into a second memory bus different from its nominal bus when an error condition exists. Thereafter, processor requests to the memory are channeled away from the faulty bus by the cross bar and along the second bus to maintain memory accessibility.

Module shadowing complements the basic FRC concept by providing extra redundancy to ensure that a modules's operation can be continued once a fault has been detected. (With simple FRC, detection of a fault typically implies loss of module operation.) Once a malfunction does occur the coverage degrades to simple FRC, which is adequate to protect that part of the system during the time reconfiguration is carried out.

Recovery algorithms are the specific actions (and the support for such) required at the crossbar and MCU to allow the system, functioning as a distributedly-implemented whole, to respond to error reports and to handle memory bus switch-over and shadowing.

Error Detection

The amount of redundancy required for verification of correct information transmission is significantly reduced by the use of encoding techniques. Two types of encoding, both linear, are used.

1. Parity is used for the detection of errors on the memory bus. Two checkbits are appended to the nineteen bits of information which will ensure that all single-bit errors are detected; multiple-bit (odd numbers) errors are detected; double-bit errors may be detected when occurring in adjacent tracks or common components; stuck at 0s and stuck at 1s are detected.

2. A Hamming code is used for error correction within the memory storage array. Seven checkbits are appended to the four-byte storage array and are computed from the data to be stored and the address of the storage location. This encoding ensures that: all single-bit errors in the data can be corrected; all single-bit errors in the address can be detected; all double-bit errors in data or the address can be detected; and multiple-bit (odd numbers) errors are detected.

The use of encoding techniques for reduction of information redundancy is not a practical proposition when the information undergoes transformation. The FRC method used requires complete duplication of all circuitry plus extra circuitry to enable comparison of operation to be made.

In order to provide FRC as described in the above-identified Jackson patent, the hardware is divided up into blocks of functionality which may include any number of components and interconnections. Each block is then duplicated and equipped with comparison logic. One of the pair is selected to be the Master the other the Checker.

A Master block is responsible for carrying out the normal operation of the system (i.e., it behaves just like conventional circuitry).

The Checker block has its outputs disabled and instead receives as inputs the output of the Master with which it is paired. It is responsible for duplicating the operation of the Master and using comparison circuitry to detect any inconsistancy in operation between the two.

This method of checking will detect any operational error occuring in either the Master or the Checker block of functionality. It will not, however, cope with errors occurring in both blocks simultaneously (i.e., a design fault).

The only circuitry that must be relied on in the event of a failure is the comparison and fault reporting logic of the Checker. Periodic testing of this circuitry during the normal operation of the system drastically reduces the likelihood of a malfunction of Master or Checker going undetected.

Time-outs are specified in the hardware to detect the breakdown in communication protocol of either the Processor or the Memory Buses. They are used to set a defined limit on the period of time that may elapse between a request and its corresponding reply.

The above-described fault-handling mechanism requires that errors from multiple independent faults not be generated simultaneously (e.g., a bus parity error cannot be generated just as the bus parity checker fails). The probability of such an event occuring are very small except when one of the faults is latent. A latent fault is a fault existing in some normally dormant part of the system. For as long as the part is dormant the fault will have no oportunity to generate errors. For example, the circuit which signals bad parity is not normally involved in system operation and could consequently contain a latent fault. This would not be detected until a parity error was detected and then a double-error condition would arise. Thus, latent fault checking must be provided for any mechanism not exercised under normal operation of the system.

The mechanisms which need latent fault checking are:

1. Memory locations not accessed under normal operation;

2. Fault-handling mechanisms for: detection; reporting and logging; and recovery;
3. Functionality (e.g., in the GDP) infrequently used during normal operation of a specific application;
4. Initialization mechanisms; and,
5. Maintenance and diagnostic logs (if present).

The fault mechanisms employed expose latent faults by periodically exercising those parts of the system not exercised under normal operation of the system. Once exposed, the faults can be dealt with the same manner as any other fault.

The following four headings describe how the above detection mechanisms are implemented:
1. Detection mechanisms required to support the confinement areas upon which the fault handling strategy is based.
2. Detection mechanisms required to check the Processor Bus protocols.
3. Detection mechanisms required to check the Memory Bus protocols.
4. Detection of latent faults.

1. Error Detection at Confinement Areas

Figure 2:
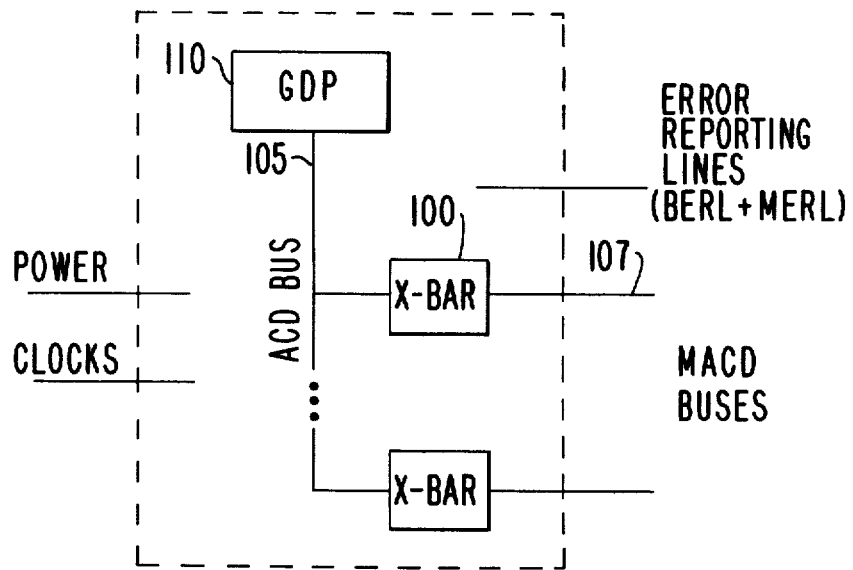
FIG. 2 is a diagram of the GDP confinement area of the data processing system of FIG. 1.

The GDP confinement area is shown within the dotted lines of FIG. 2. The GDP module's only outputs are on the MACD bus and the error-reporting lines. The MACD (107) is protected by FRC at the crossbar interface to the MACD bus. The MACD, CTL, CHK, and NREQOUT pins make up the GDP/MACD confinement area interface. The NREQOUT pin is monitored constantly, because the crossbar could assert this line at any time. The other pins are only checked when the crossbar has control of the bus.

An FRC error on any of these pins indicates that an error has occurred inside the GDP confinement area. This detection interface covers errors which occur in the GDP, on the ACD bus, in the crossbars, and at the chip/package/socket/board interfaces. The fault coverage provided by FRC is virtually 100% because of the complete duplication of the processing module (100), (one Master and one Checker). Except for design errors, there are almost no common failure modes; environmental disturbances will most likely produce different results in the Master Processor and the Checker Processor.

The error-reporting lines are protected by a parity bit. This detection mechanism catches any single-bit (or multiple odd-bit) failures. There is no detection mechanism to guarantee that the error-report message is generated correctly by the crossbars (see the section on detecting latent failures). However, a line which is stuck "on" is detected by a parity error (i.e., all ones will cause a parity error).

Figure 3:
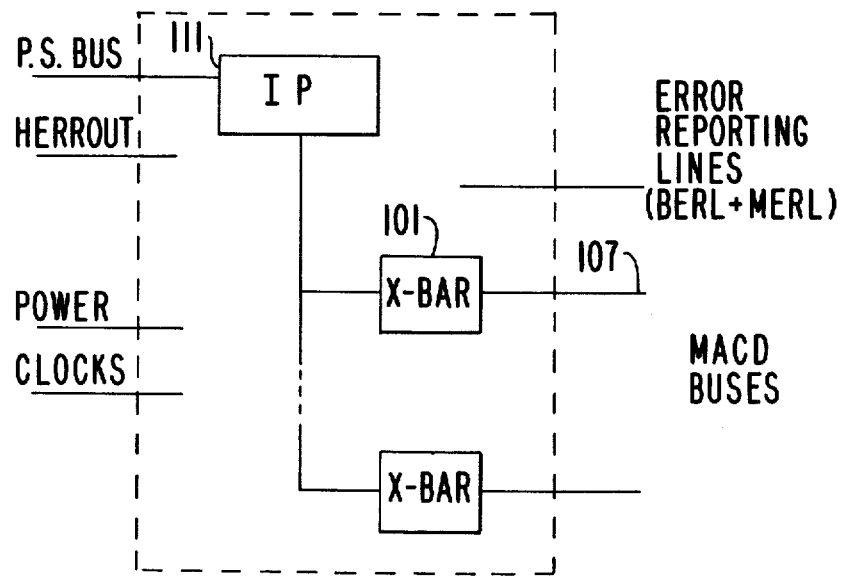
FIG. 3 is a diagram of the IP confinement area of the data processing system of FIG. 1.

The IP confinement area is shown within the dotted lines of FIG. 3. The IP module's outputs are very similar to the GDP module's outputs. The IP module has the same detection interface into the central system as the GDP module. It has an additional interface into the peripheral subsystem (PS bus). The PS bus is protected by FRC (both control and data pins). Because the PS bus is an asynchronous interface, the FRCed pins are sampled at one point in time when they are supposed to hold valid data. The PS may actually sample the data at a different time.

The HERROUT pin (error-report signal to the PS) is not checked. There is no way to check its correct operation while the system is running.

Figure 4:
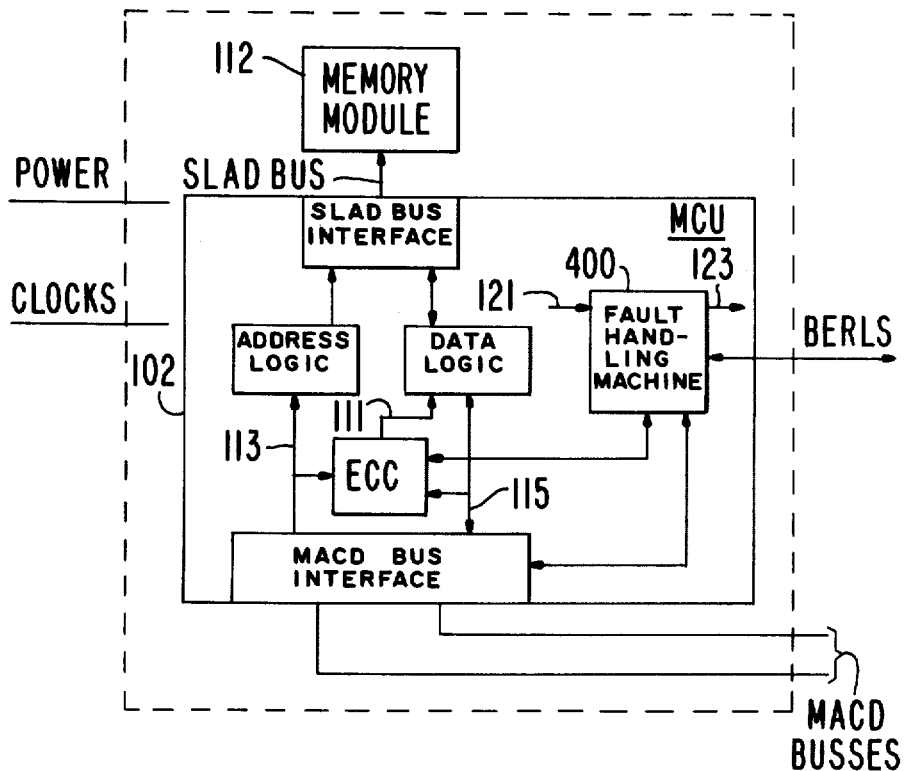
FIG. 4 is a diagram of the memory confinement area of the data processing system of FIG. 1.

The memory-confinement area is shown within the dotted lines of FIG. 4. The memory-confinement area is protected by two independent detection mechanism. A seven-bit ECC code (single-bit correcting, double-bit detecting) is applied to the address path and the RAM storage chips within the memory module (112). FRC is applied at the master MCU and the checker MCU (102) on both the storage local address and data (SLAD) and MACD buses. These two sets of detection mechanisms provide checks on the operation of the MCU, the tranfer of data between the MCU and the array, and the data storage in the array. On the array side, the array control lines (row address strobe-RAS, column address strobe-CAS, write enable-WE) are FRCed after passing through the TTL. The SLAD lines are FRCed at the MCU pins. Besides detecting an MCU failure, FRC on the SLAD lines will detect a stuck-on buffer in the TTL/SLAD interface. Because the Checker cannot respond quickly enough to prevent damage to the array under all conditions, failures detected by FRC on the array side of the MCU are assumed to do unknown damage to the array.

The ECC checksum (111) is based on the address (113) as well as the data field (115) (i.e., the same data value stored in different locations will have different ECC checksums). This approach allows the ECC code to provide detection for failures in the RAM chips, the address lines, and the TTL buffers and latches. The MCU implements all write operations as RMW operations (address, read data, check ECC, generate ECC, write data). Thus, the MCU guarantees that the data is always written into the correct location.

| Correctable errors: | Single-bit data failures. |
|---|---|
| Uncorrectable errors: | Double-bit data failures, one- or two-bit address failures. |

The TTL circuits are only protected as long as the fault manifests itself as a single or double data/address bit fault. There are classes of failure (total chip failure) by the TTL circuits that will not be detected by ECC.

The MACD bus interface-detection circuits are different on the MCU than they were on the crossbar. The MACD, PAR, CTL, REQ (first cycle only), and BUSSEL (bus select) lines make up the MCU/MACD confinement interface. An error on these pins means that an error has occurred within the MCU.

Because the MCU is attached to two MACD buses to provide an alternate addressing path in case of failure of the primary path, the BUSSEL lines from BOTH the Master and Checker are ANDed to form a Bus Enable. This prevents an error in one component from disrupting activity on two buses (thus causing a system failure). For this reason the Checker component has two BUSSEL pins, one for FRC and one for bus enable.

Another consequence of the MCU's attachment to two buses is some ambiguity in whether a failure should be classified as a bus or a module failure. This is not a problem for the crossbars because each crossbar is attached to only a single bus. Thus, the crossbar: MACD interface belongs to a single MACD confinement area. MCU failures in priority arbitration (arbitration resides partially in each VLSI node) and the parity-detection circuits (indicates parity error, but really it is a broken detection circuit) are treated as failures in both the bus and the module confinement area. These errors are detected, but they are handled as a special case by the error-reporting mechanisms. (Normally these would be handled as bus errors, but since the actual failure may be in the MCU, switching the MCU to a backup bus may cause the error to reoccur on that bus also.)

REQ (not first cycle) FRC error or MBOUT FRC error indicates an error in the priority arbitration network. This error occurred either in the arbitration lines or the MCU which detected the error. A parity error indicates either an error in the parity detection circuits at this MCU, or an error on the MACD bus lines.

Coverage of the error-report line is the same as in the GDP confinement area.

Figure 5:
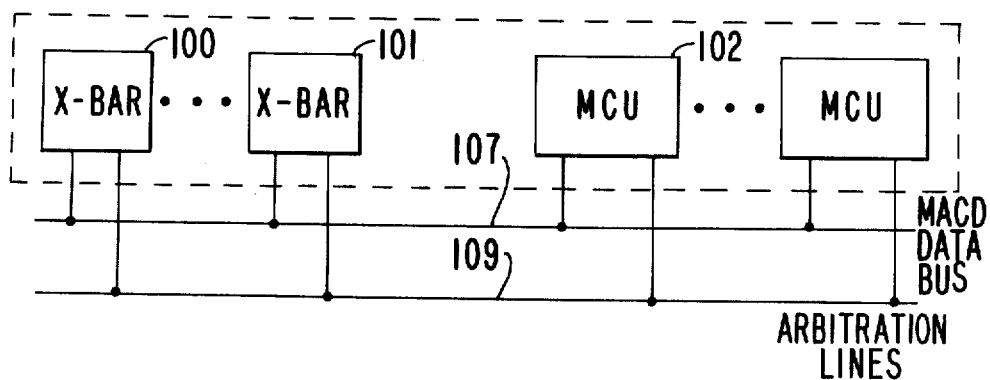
FIG. 5 is a diagram of the MACD bus confinement area of the data processing system of FIG. 1.

The MACD Bus confinement area is shown within the dotted lines of FIG. 5. The MACD bus confinement area is protected by three independent mechanisms. The MACD and CTL lines are protected by two parity bits (CHKO, 1). The bus protocol is such that only one device drives the data and control lines at any point in time (i.e., no handshaking). Two parity bits are used in an interleaved fashion to gain protection against certain classes of multiple failures. The parity mechanism can be used to protect the TTL buffers at the bus interfaces.

Every node on the bus (except the one driving) checks for correct parity on every bus cycle. This guarantees that parity is checked during the address transmission cycles.

The arbitration lines (109, NREQ#, RQ#, CONT#) are protected by duplication. There is one set of arbitration lines for Masters, and another set for Checkers. The Masters are responsible for driving both sets of lines (allows FRC checking), but the arbitration lines are sensed independently by Master and Checker. A failure in the arbitration network is detected by an FRC error on a node's REQOUT or MBOUT lines. (The MBOUT line functions as a GRANT line.) The error cannot be directly linked to the node which detected the failure. The failure may have occurred on the lines or within the node which detected the failure.

If the MCU detects parity error or an FRC error on MBOUT, it is impossible to determine if the failure is on the bus or in the MCU. These errors are handled as a special case by the error-reporting mechanisms.

2. and 3. Bus Protocol Error Detection

Two time-outs are used to detect violation of bus protocols: ACD bus time-out and MACD bus time-out. These time-outs are not used to detect any hardware failures. These time-outs are used to detect storage descriptor errors (OS error), component design errors, the presence of a node at initialization, and the lack of a backup resource to provide recovery after a permanent fault.

ACD Bus Time-Out

The processors except all of their ACD bus requests to be acknowledged within two clock cycles. If no acknowledge has been received on ISB, this is interpreted as a BUS ERROR by the processor.

MACD Bus Time-out

Each node on the MACD bus maintains a pipeline time-out. This time-out is activated whenever a bus message is sent which changes the state of the bus pipeline (unless it empties the pipeline). When the time-out completes, all nodes on the bus treat the time-out as a pseudo reply. The pipeline is decremented and the node which received the pseudo reply (i.e., had the oldest outstanding bus request) returns a BUS ERROR back to its processor.

Protocol violations (i.e., time-outs) are not reported or logged. Protocol violations do not represent hardware errors; thus, they are treated separately. The processor which generated the access causing the protocol violation is informed of the error via the BUS ERROR significance of ISB. No other element in the system is informed of the error.

4. Detection of Latent Faults

Memory Locations

The mechanism for periodically accessing all memory locations is known as scrubbing. Scrubbing is tied in with the refresh mechanism to achieve the function without any additional performance degradation or software intervention. This is accomplished by reading one location during every refresh access. The data read is checked using the ECC mechanism. This guarantees an access to every location approximately once every 15 seconds or less. In this way, scrubbing virtually eliminates the probability of an access encoutering a word with a double-bit soft failure.

Fault Handling

Detection Mechanisms

Periodic exercising is needed for the FRC, Parity, ECC, and Pipeline Timeout detection circuits. The detection mechanisms are exercised via specific commands to the MCU and crossbar. The test commands identify ONE node to be tested. The tests are carried out without corrupting any information which leaves the addressed module.

The crossbar detection mechanisms (FRC and parity) are exercised in the following way:

1. The test is initiated by a "Test Detection" command which is a local register *read* access request. The command is directed to a single node from another node. The MACD bus must be used so that when the node under test returns the read data it can exercise its MACD parity and FRC circuits.
2. The detection circuitry is exercised when the crossbar returns the read data. All the FRC internal inputs are inverted (thus forcing an error at each comparator). The results from the comparators are ORed together (normal FRC connection) and ANDed together (checks each comparator). The two parity bits are inverted internally as they enter the parity checker. This should generate parity errors in both parity trees. By placing different data values in the Test Register, the complete parity tree may be exercised.
3. The logging and reporting section of the crossbar receives all of the error reports. If all the detection circuits are working, then no action is taken. If one or more of the detection circuits does not work, then this causes a Module Error error report. This error report will cause the original Test Command to be retried. Thus a distinction is made between permanent and transient errors in the same way as normal errors are handled.

MCU Detection Mechanisms

The ECC detection circuits are exercised in the following way:

1. Bad ECC is written into a memory location using the Storage Array Address register (allows explicit ECC addressing).

2. The scrubbing mechanism will detect and correct the error. If the ECC mechanism is not working, the checker MCU will signal an FRC error. There is no need to go back and read the location.

The MCU FRC and parity detection mechanisms are exercised in a manner similar to the crossbar exercise:
1. The Test Detection command is a read of the memory location specified by the Storage Array Address Register.
2. The array FRC comparators are checked when the address is sent to the array. The MAD bus FRC and parity circuits are checked when the data is returned to the requestor.
3. Reporting is identical to the crossbar case.

Exercising the Error-Report Networks

The error-reporting network must be functional for the machine to handle error conditions correctly. Although certain error conditions can be tolerated, there are single failures in the error-report network which will prevent the correct reporting of errors in the system. The report line exercises are designed to confirm that the report lines are all operating correctly.
1. Error-Report Generation.
   A. Tested by sending a command to one node (either crossbar or MCU, master or checker) requesting that it send a TEST error report.
   B. The logs are then read to make sure that the error report was correctly generated.
2. MERL Propagation.

After an error-report message has been logged, the MERL register in each crossbar is checked. Bit 0 is set if an error report was received over the MERL.

Recovery Mechanisms

Latent faults may exist in the retry, bus switching, module switching, spare memory bit-switching mchanisms as well as the backup resources themselves (backup bus transceivers, backup module, and spare memory bit). These latent faults are exposed in the following manner:
1. Retry: Retry for transient errors is exercised each time a Bus Interchange, etc. is executed (see preceding section). Retry under permanent error conditions is not exercised.
2. Bus Switching: Bus Switching is exercised as follows:
   A. The test is initiated by a software command which causes a node to generate a Bus Switch Test Error-Report Message.
   B. This Error-Report Message causes a retry sequence to start in all nodes. During this sequence all crossbars interchange primary and backup address ranges, while all MCUs switch to their backup bus. This operation is an interchange—the old normal address ranges and buses now serve as backups. There is no loss of protection because of this test.
   C. Retry is carried out and normal operation resumes in the new configuration.
3. Module Switching: Module switching is exercised by the ping-pong action which is normal operation in a shadowed system.
4. Spare Memory Bit Switching: This mechanism is exercised by software switching the spare bit into the array periodically. (Software is responsible for switching in the spare bit during fault recovery, also.) After switching in the spare bit, an FRC error will result if the switch was not successful.
5. Backup Bus Transceivers (MCU): These transceivers are exercised as part of the bus switching test.
6. Backup Module: The backup modules are exercised by the ping-pong action which is a part of normal Shadow operation.
7. Spare Memory Bit: This bit is tested by periodically switching it into the array.

Reporting Mechanisms

Reporting Strategy

Whenever an error is detected in the central system (the central system does not include IP:PS interface), the detecting node crosspoint switch reports the error occurrence to all the other nodes in the system. The error report describes the type of error which occurred and the ID of the node which detected the error. An error-report message is broadcast over the reporting network matrix (MERL and BERL) which follows the topology of the bus matrix (ACD and MACD). This reporting network has no single-point dependencies (assuming two or more processor modules), and errors are localized to either a bus or module confinement area. This message is uniformly logged throughout the central system. Each node then begins the recovery process. During recovery, higher authorities (processor microcode) may be informed of the reported error.

Errors detected at the IP:PS interface are handled separately. The errors are reported only to the attached processor (AP) attached to this IP. The HERROUT signal is an interrupt to the AP. HERROUT remains asserted until it is cleared by the AP logic. The AP alone is responsible for recovery from the error condition. The IP:PS interface represents a firewall between the central system and the I/O subsystem.

Error-Report Message

The format of the error-report message is given below, followed by a description of each of the fields in the message.

Message Format

| | |
|---|---|
| START | −2 bit |
| SEQUENCE FIELD | −1 bit |
| ERROR TYPE | −4 bits |
| NODE ID | −9 bits |
| PARITY | −1 bit |

Start Field

These bits indicate the beginning of an error report message. The first bit is a zero (low), the second bit is a one (high). This two-bit sequence is used to prevent stuck low failures from generating erroneous error reports. These reports are prevented because a stuck fault will only generate a single transition, while an error message requires a double transition to start.

Sequence Field

This bit indicates if this message is the original error report (zero) or if it is being rebroadcast to propagate (one) the error-report message. This field is needed for testing the error-report lines and informing MCUs of the start of recovery.

Error-Type Field

The table below lists all of the error types and the mapping between error types and error detection or test mechanisms.

| Error Type | Detection Mechanisms |
|---|---|
| 1111 BERL PARITY ERROR | Crossbar parity error on a message MCU reports Mod/Dat error received over the BERL |
| 1110 MERL PARITY ERROR | Parity error on a message received over the MERL |
| | MCU: |
| | RAS, CAS, WE, DEIN, FRC SLAD BUS FRC |
| | CROSSBAR: |
| | None |
| 1101 UNSAFE MODULE | |
| 1100 BUS ARB REQOUT, MBOUT FRC | |
| 1011 BUS/MODULE HIGH | MCU: |
| | BERL or bus arbitration |
| 1010 MODULE ERROR | MCU: |
| | MACO, PAR, CTL, BUSSEL FRC Detection Test fail |
| | CROSSBAR: |
| | MACD, CTL, CHK, NREQOUT FRC Detection test fail |
| 1001 BUS PARITY ERROR | MCU: |
| | NONE (all reported as Bus/Module) |
| | CROSSBAR: |
| | MACD bus PARITY |
| 1000 MODULE/BUS ERROR | MCU: |
| | This is done to prevent a true bus error from killing both P & S memory modules. MBOUT FRC MACD bus parity, RAOM, BERL parity |
| | CROSSBAR: |
| | RAOM Same for mod error, not killing two buses. |
| 0111 UNCORRECTABLE ECC* | MCU: |
| | Double-bit memory data error Single- or double-bit address error |
| | CROSSBAR: |
| | None |
| 0110 CORRECTABLE ECC* | MCU: |
| | Single-bit memory data error |
| | CROSSBAR: |
| | None |
| 0101 TEST REPORT | Test command |
| 0100 INTERCHANGE BUS | Bus interchange software command |
| 0011 ATTACH BUS | Attach bus software command |
| 0010 DETACH BUS | Detach bus software command |
| 0001 NO ERROR | Generated by correct operation of test detection command. |
| 0000 TOGGLE | Exchange denotation of primary and backup on the MCU's bus IDs. |

*These reports are always generated when the error is detected by a normal access. If the error was detected during a scrubbing access, a report is generated only if the ECC log is updated.

Each of these error types are encoded in a four-bit field in the error-report message. The bit field is ordered in the same sequence as the previous table of error types (BERL ERROR=1111).

Node ID Field

This ID field will hold the node ID of the node which detected the error. The node ID is made up from two subfields: a bus ID and a module ID. The node ID specifies the physical interconnect location of this node. The node ID cannot be modified by software.

| Node ID | |
|---|---|
| Bus ID: | 3 bits (0–7) |
| Module ID: | 6 bits (0–62) (63 is not valid) |

Parity Field

This one-bit field terminates the report message. This bit provides odd parity over the message. Even parity was chosen so that a stuck-line fault (all ones) will be detected by the parity mechanism.

Motivation for the Error Types

The selection of the error types represents a compromise between message length and the detailed information known about the fault. The error types were selected because they represent an adequate amount of information to carry out recovery and to test the system. Listed below are the specific reasons for including each of the error types.

BERL PARITY ERROR: Errors on the report lines are handled as a special case during retry (see recovery sec-

| | |
|---|---|
| | tion). Also, if the error is permanent; the nodes must know which confinement area to reconfigure around (Bus or Module). |
| MERL PARITY ERROR: | See BERL ERROR. |
| UNSAFE MODULE: | This type is used to specify that the error has left the module in an inconsistent state. This module must be immediately isolated (no retry) from the system because the data integrity of this module can not be guaranteed. |
| MODULE ERROR: | Identifies the confinement area in which the error occurred (coupled with node ID). |
| BUS ERROR: | See MODULE ERROR. |
| UNCORRECTABLE ECC: | This type is required because this specific error is handled differently if no shadow is present (see recovery section). |
| MODULE/BUS ERROR: (high or low) | This type identifies two confinement areas within which the error may have occurred. This type is required for a small class of ambiguous errors detected by the MCU. |
| TEST REPORT: | This type is required to exercise the report network. |
| INTERCHANGE BUS: | This type is used to test the bus switching recovery mechanisms. It is an error type because the reporting network is the only way to inform all nodes on two buses of the test. Also, the interchange is a different operation than the bus switch that occurs during recovery. |
| TOGGLE: | This report is used to assign the specified MCU to a new MACD bus. This must be done via an error report because some memory accesses may be lost after the MCU switches buses. |
| ATTACH BUS: | This type is used to bring a bus on line in a system after being removed. The error reporting network is the only way to inform all nodes on two buses of the operation. |
| DETACH BUS: | This type is used to remove a bus from operation. See ATTACH BUS. This allows software to deactivate a bus having intermittent failures. |
| NO ERROR: | This type allows the test detection command to check all the error detection circuits, including those in the error report generation area. |

Logs

There are two types of logs in the system. The primary logs are the Error Report Logs. Every node in the interconnect system has an error report log. These logs will always hold identical values. MCUs have a secondary log, the Array Error Log. Theses logs hold information about errors in this array detected by ECC. The values in the array error logs are unique for each array-MCU pair. (NOTE: Primaries and shadows may have different values in their array-error logs.)

Error-Report Log

The format for the error-report log is given below followed by a description of each of the fields in the log.

| Log Format | |
|---|---|
| TRANSIENT/PERMANENT | 1 bit |
| ERROR TYPE | 4 bits |
| ERROR COUNT | 2 bits |
| NODE ID | 9 bits |

Transient/Permanent Field

This bit indicates whether the error which is currently logged was a permanent or transient error. The first report of any error is labeled as a transient. If the same error (identical error type and node ID) is reported a second time while retry is in progress, then the error is labeled as permanent. MERL and BERL parity errors are an exception. Only the module (bus) ID needs to be identical, and the error type must be repeated.

Error Type Field

This field is identical to the error-type field in the error-report message.

Error Count Field

This two-bit field is incremented each time an error is reported. This field is used by software to track its accesses to the error logs. The counter does not wrap around, if it reaches the value 3, it stops until explicitly cleared. The counter is cleared by the INTERCHANGE error report.

Node ID Field

This field is identical to the node ID field in the error-report message.

Contents of the Error Report Log

The error-report logs are used independently by both hardware and software. For proper hardware recovery, the log must always hold the information from the most recent error-report message. From a software point of view, the log must satisfy two needs: (1) provide consistent error log data to the requestor, and (2) uniquely identify error reports so that software can distinguish between the single occurence of an error and repeated occurrences of the same error.

These requirements are satisfied in the following way. The hardware is in full control of the error log. The log is immediately updated whenever an error-report message is received. The error-count field is used to satisfy the needs of the software. Whenever the hardware updates the error log, it increments the error-count field.

After software reads the log, it must clear the log with an interchange command. When software reads the log, a count field value of zero indicates that no new error report has been received. The error-report log is accessed in a single operation and thus always provides consistent error information.

Array-Error Log

The format for the array-error report log is given below, followed by a description of each of the fields in the log.

| Log Format | |
|---|---|
| ECC Syndrome | 7 bits |
| Access Address | 20 bits |
| Status | 4 bits |
| scrub error | |
| single-bit error flag | |
| multiple-bit error flag | |
| multiple ECC errors flag | |
| FBE flag (Force Bad ECC) | |

ECC Syndrome

This field allows software to determine which of the ECC protected bits (address or data) failed. For single-bit errors, the syndrome field points to the bit which failed (one of 39 memory bits and 20 address bits). In multiplebit errors, the syndrome does not hold any useful information.

Access Address

This field specifies the array address for the access which failed. This address can be used by software to deallocate a block of memory with a bad memory bit.

Status

The status flags serve two purposes. First, they provide status information about the array error log. Second, they act as a lock to guarantee that software always receives consistent data when it accesses the log.

Scrub Error

Tells if the access that resulted in failure was due to a memory access or a scrub access.

Single-Bit-Error Flag

This status flag identifies the error logged as a single-bit error. When this bit is set, the ECC syndrome field points to the faulty bit.

Multiple-Bit-Error Flag

This status flag identifies the error logged as a multiple-bit error. When this bit is set, the ECC syndrome field does not have any meaning. The single-bit, error-status flag, and the multiple-bit, error-status flag cannot both be set at the same time.

Multiple-ECC-Errors Flag

The array-error log holds the error information for the FIRST ECC error detected. If more than one error is detected before the log is cleared by software, then this status flag is set, unless it was a scrub error. No other information is changed in the log.

FBE Flag (Force Bad ECC)

This status flag is set whenever the MCU executes a FBE command. The FBE command is used to lock an inconsistent memory word or words by forcing the ECC to indicate a multiple-bit error. This status flag is present so that software is informed that the FBE, not a RAM failure, may have been the cause of the ECC error.

Contents of the Array-Error Log

The array-error log is updated by hardware and read by software. This implies that a synchronization lock is required to guarantee that software always receives consistent log data. The information in the error log is not used by the hardware. Synchronization is achieved in the following way. Hardware will only update the address and syndrome fields if the log is empty.

If the log is not empty, then the multiple ECC errors flag is set. Hardware updates the address and syndrome fields (if allowed), before updating the status field.

When software access the array-error log, it must access the status field first. If the status field indicates that the log is empty, then the value of the address and syndrome fields is indeterminate. If the log is not empty, then the address and syndrome fields hold the error information for the first error detected. When software has finished reading the log, it can enable further error logging by clearing the single-bit error, multiple-bit error, and multiple ECC errors flags.

Error Reporting Network

Network Topology

The reporting matrix shown in FIG. 1 provides the communication path for error-report messages throughout the system. Path redundancy is achieved by interconnecting the nodes both horizontally (along the MACD bus) and vertically (along the ACD bus) in correspondence with the crossbar-switch topology. The horizontal lines are called Bus Error Report Lines (BERL) and the vertical lines are called Module Error Report Lines (MERL). All nodes sharing an MACD bus are connected together with the BERL line, all nodes sharing an ACD bus are connected together with the MERL line.

Memory nodes (MCUs) are connected to two BERL lines on each bus (primary and backup buses).

Figure 6:
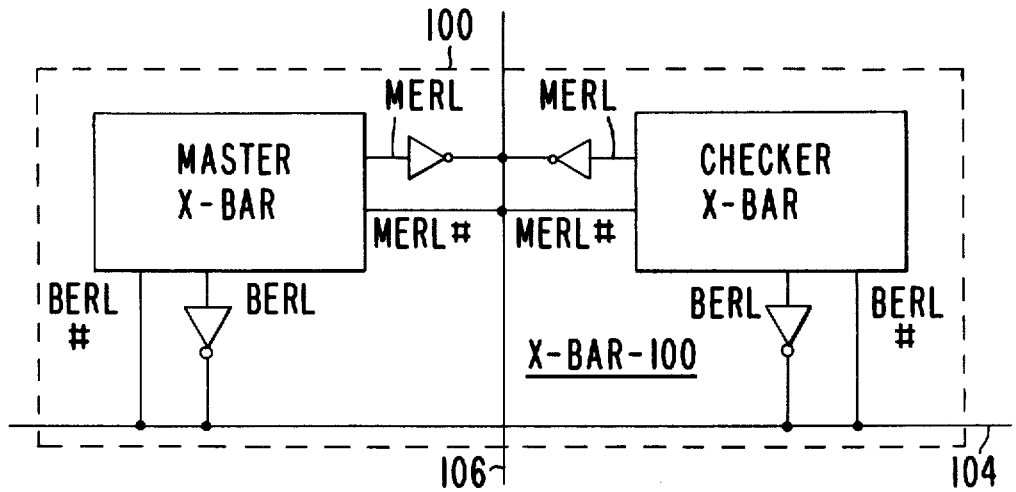
FIG. 6 is a diagram of the master and checker crossbar (X-bar) of the data processing system of FIG. 1.

The crossbar connection to the error-reporting matrix is shown in FIG. 6. Outputs to the matrix are connected via open collecter devices. A pull up is required on both MERL and BERL lines (not shown).

Figure 7:
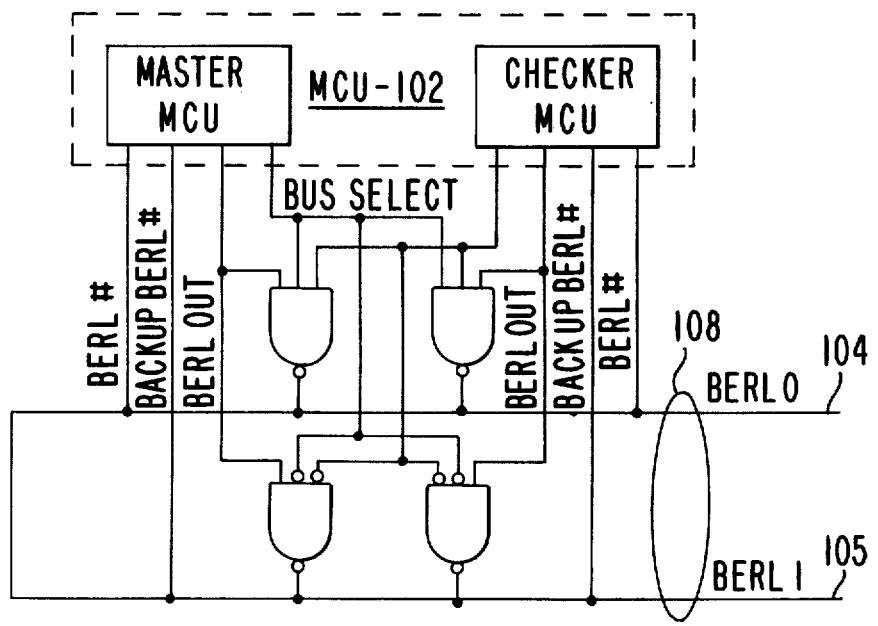
FIG. 7 is a diagram of the master and checker memory control units (MCU) of the data processing system of FIG. 1.

The MCU connection to the error-reporting matrix, shown in FIG. 7, is via two BERL lines (104, 105). It also allows a memory module to be defined as a single MCU and its array. The MCU only reports errors over the BERL of the bus to which it is attached; however, it can receive error reports from either the primary bus (104) or the backup bus (105).

This interconnection topology has the following major characteristics:

1. No single-point dependencies. No one failure can remove more than one BERL and one MERL from service.
2. Redundancy. The loss of MERLs and BERLs does not prevent errors from being correctly reported. As long as the system has a BERL for each active bus, and one MERL in the system, errors will be correctly reported. Failures of the BERLs cause removal of a bus. Failure of a MERL causes the removal of a module.

Message Propagation

Whenever an error is detected in the system, the error is reported in the following manner:
1. The node detecting the error sends an error-report message along its BERL. All nodes on this bus terminate operation upon receiving the start bit in the error message. The delay on this transmission is critical to guarantee that a confinement area does not operate on incorrect data. The node detecting an error must send the start bit of an error-report message no later than one clock after the last cycle of the MACD bus message. The receiver of a MACD bus message waits for two clock cycles before using the message it received.
2. After the complete error-report message has been received over BERL, all the crossbars on this bus rebroadcast the message on their MERLs. This informs the crossbars on other buses that an error has occurred. All nodes stop operation upon receiving the start bit of the error-report message. The delay between error detection and this report message is not important because the error does not affect operation on the other buses.
3. All crossbars in the system now know about the error. After receiving the complete error-report message over MERL, all crossbars rebroadcast the message (the report message from MERL) over their BERLs. This informs all nodes (MCUs and crossbars) of the error which is to be logged.

Error-Report Arbitration

In rare cases multiple errors may be detected simultaneously. When this occurs, an arbitration mechanism is invoked to decide which error will be logged throughout the system. The primary arbitration mechanism is first come, first served. The secondary arbitration scheme is a priority ordering of error types and node IDs.

The rules for the primary arbitration are listed below:
1. An error-report message may not be stated (or rebroadcast) if another error-report message is in progress on the error-report line. The error report which was overruled is totally ignored (no trace of it remains anywhere).
2. If a node receives error reports over BERL and MERL at the same time, only the report on MERL will be acted upon. Because the report on MERL is in phase two of error-report propagation, that error was detected before the error currently being reported on BERL.

The rule for the secondary arbitration is as follows:

During the transmission of an error report, a node may only continue to broadcast if the bit received in the last time interval was the bit which it sent. Because the error-report line is a wired-OR signal, a one (low) will override a zero (high) on the line. Thus, messages are ordered first by error type, because error type is broadcast first, (BERL error has highest priority, detach bus has lowest priority), then by the ID of the node which detected the error.

These arbitration rules guarantee that all nodes will log the same error even if multiple errors were detected. If the errors which were overruled were permanent errors, they will be reported during subsequent retries.

Error-Report Lines Parity

This parity procedure covers failures in the parity generators/detectors as well as on the error-report line itself.

If a parity error is detected, then set the parity-error flag. At the end of error reporting, if the parity-error flag is set, then set the parity-override flag. If the parity-error flag is not set at the end of reporting, then clear the parity-override flag.

Upon receiving a parity error on an ERR when the override flag is cleared, then propagate a "no error" error report. If the override flag is set, then propagate a BERL error if the error is received on BERL, or a MERL error if the error is received on MERL. This information is also loaded into the error log. This sequence keeps all crosspoint switch nodes in step and prevents infinite loops.

Errors During Message Propagation

The parity bit allows the nodes to detect errors in the error-report message. If an error is detected, the following actions are carried out:
1. The node rebroadcasts an error-report message which has an all-zero error-type field (no error), and the node ID of this node. The node must rebroadcast this message, so that all nodes receive an error report (required to get all nodes to enter retry). At this point, there is no guarantee that all nodes have logged the same error. (For this reason an error line error report cannot be broadcast because it will cause incorrect recovery.)
2. Any node which detected a parity error will report that error (BERL error or MERL error) during the following retry sequence. This action is required to guarantee that all logs in the system hold the same error information.

Informing Higher Authorities

The error-report lines allow the hardware system to report errors and begin recovery at the hardware level. If the fault was permanent, or if recovery was not successful, the hardware level must immediately inform system software of the problem. There are two signals used for this purpose:

Signal Name: ISB (ALARM SIGNIFICANCE)
Input:
  PU (GDP/IP)
Output:
  Crossbars. Any crossbar attached to the PU may assert this signal.
Purpose:
  To inform the PU that a hardware recovery has taken place and it is now in a vulnerable condition.
Response:

| | |
|---|---|
| GDP | Finish the current "instruction" (macro operator or internal operator). Suspend the current process. |

-continued

| IP: | Redispatch from the alarm dispatching port.<br>Finish the current operation.<br>Suspend the current process.<br>Redispatch form the alarm dispatching port.<br>Generate a function-complete interrupt. |
|---|---|

The PU is informed of the alarm in the same way as it is informed of an interprocessor communication, IPC (the crossbar asserts ISB at an appropriate time, and the PU in response reads the P-local register [address=2] which has bits for local IPC, global IPC, and shadow alarm notification present). (NOTE: Shadow-alarm notification has priority over global IPC notification, which has priority over local IPC notification.)

Signal Name: ISB (BUS ERROR SIGNIFICANCE)
Input:
   PU (GDP/IP)
Output:
   Crossbars. Any crossbar attached to the PU may assert this signal.
Purpose:
   To inform the PU that it has caused a violation of the Bus protocols (ACD or MACD), BUS ERROR will be returned in response to an access request which is made to either a nonexistent crossbar or to a nonexistent memory module.
Response:
   GDP/IP in logical mode.
     Pull Fatal, wait for IPC
   IP in physical mode.
     Pass error report to EP.

Redundancy

The system is provided with backup resources for fault recovery. Backup resources are classified as either alternate resources or redundant resources. Alternate resources can be used for on-line reconfiguration if the resource does not hold any state information (buses), or off-line reconfiguration for resources with state information (GDP). Redundant resources are used for on-line reconfiguration of a resource with state information (GDP).

Memory Array

Error-Correcting Code

The 39-bit storage word includes seven bits of redundant information (ECC). This ECC not only provides detection, but also allows correction of any single-bit errors in this storage word.

Spare Bit

The memory array contains one spare bit for each storage word in the array (a spare RAM chip or column identical to the other chips in the array). This spare bit may be used to replace any other bit in the 39-bit storage word.

Retry Buffers

Each ACD bus request from a processor is held in a retry buffer in all of the crossbars attached to the processor. The information is held until the processor receives the acknowledge to its request. This redundant information allows an access to be retried at any time.

Memory Buses

All the memory buses in the system are physically identical. However, when a set of buses are operational, each one handles a unique address range. Each memory bus (actually the components attached to the bus) is designed to act as a backup for one other memory bus. The backup bus is implemented in the crossbar and MCU in the following ways:

Crossbar

There are two sets of participation logic operating in each crossbar. One set on the normal address range, and the other on the backup address range. Either set may be enabled (normal or interchange operation), or both may be enabled (bus switch).

The normal bus and the backup bus must not have contiguous address ranges. This guarantees that no *single* access will go to both the normal bus and the backup bus.

On any retry sequence, buses may be reconfigured. The crossbar must be able to accept bus reconfiguration and recompute access participation during retry.

MCU

Each MCU is physically attached to two memory buses. At any instant in time, the MCU is only logically attached to one memory bus.

The logical bus attachment is chosen by a bus select line from the MCU. The MCU may only attach to a bus if *BOTH* the master and the checker want to attach to the same bus. The bus select line controls attachment of all lines associated with a bus (MACD, CHK, RQ#, CONT#, BERL).

RMW locks are held in the MCU. This is required so that the locks move with the storage array.

The MCU must be able to switch buses during any retry sequence.

An important note about the backup memory buses is that the scheme can only be implemented with two buses with one spare bus. This is required to meet the address range requirements of the crossbar.

Modules

There are three module types in the central system: GDP, IP (with an associated attached processor, AP), and Memory. All GDP modules are identical; thus, any GDP module can act as a backup resource for any other GDP. Each IP module provides an interface between the central system and one I/O subsystem. All IP modules have identical interfaces into the central system, but potentially different I/O subsystem interfaces. To act as a backup resource, the IP module must interface to the same AP. Memory modules are only attached to two memory buses. Backup memory modules must be attached to the same memory buses.

A backup module can always be used as an alternate resource for off-line reconfiguration. Acting as a redundant module requires far more coordination between the modules. This cooperation is described in the following sections.

Module Shadowing

Module shadowing is a technique which provides a complete and current backup module for any logical module. The module pair operates in lock step. One module is called the Primary, the other the Shadow. At any instant in time these two self-checking modules are aligned to form an Active Module and a Redundant Module (complete and current backup module). The Active Module is responsible for all external signaling. The Redundant Module is passive, and simply tracks the operation and state information of the active module.

There are four basic mechanisms required to supply shadowing:

1. Start up and synchronization of a module pair.
2. Coordinated operation.
3. Error detection.
4. Deactivating shadow operation.

These mechanisms are implemented only in the crossbar and MCU. The GDP and IP are unaware of shadowing operation. (Interface logic between an IP and the AP is also aware of shadow operation.) Although logically, shadowing is the same independent of module type, the four mechanisms will be explained for each module type.

GDP Module Shadowing

Start-up

The basic function of the start-up sequence is to:

1. Have the Primary/Shadow processors use the same processor object so every reference is identical.
2. Have the Primary/Shadow processors be synchronized at the microinstruction level to guarantee that memory references occur on the same clock cycle.

Figure 8:
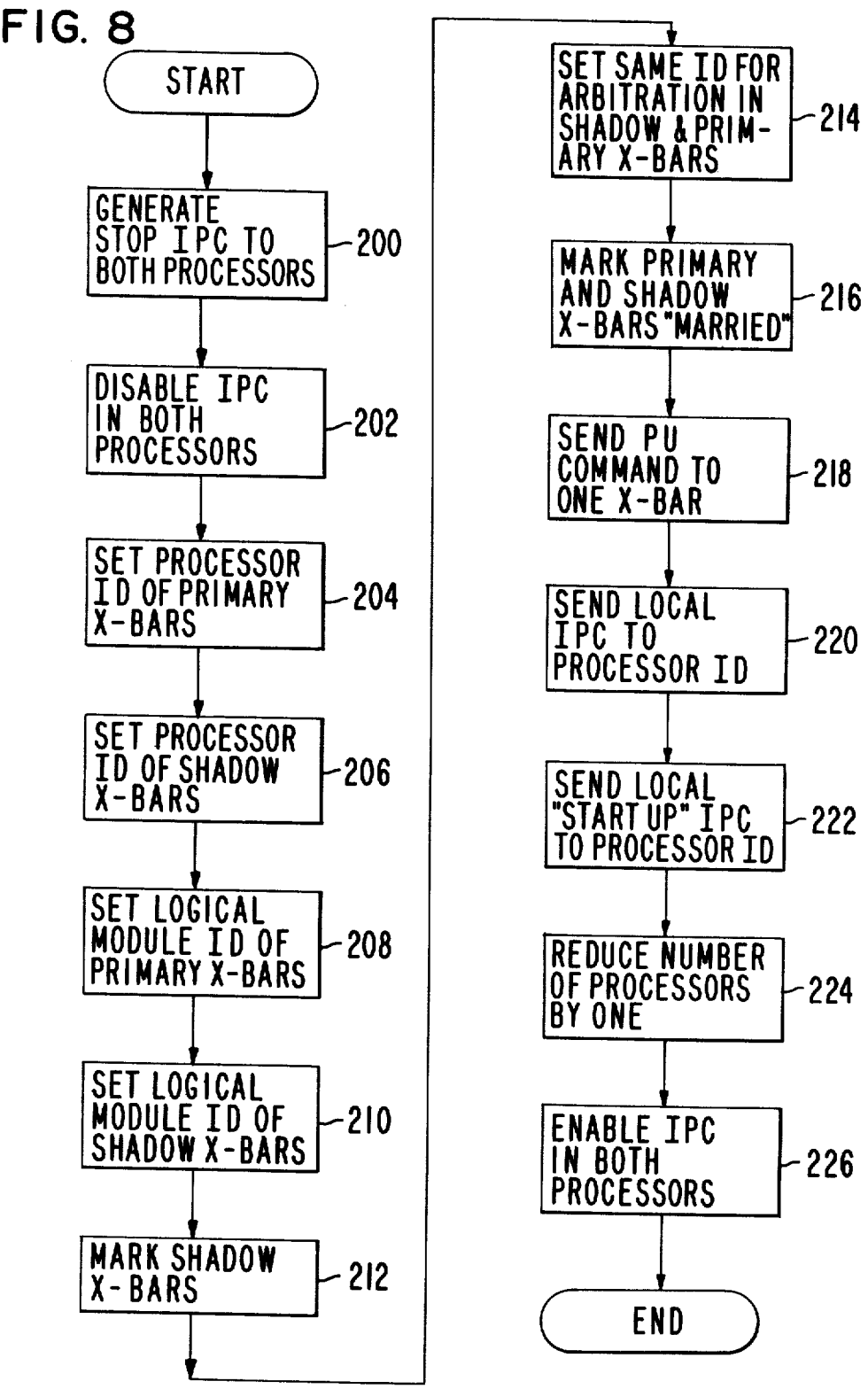
FIG. 8 is a flow diagram of the start-up process for start up and synchronization for shadow operation of a GDP module pair shown in the data processing system of FIG. 1.

The specific steps necessary to start up a Primary/Shadow pair require that some other processor (a third processor, either a GDP or an EP/IP pair) execute a monitor process. The steps that the monitor process performs are shown in the flow chart of FIG. 8 and are as follows:

1. The two processors are stopped in a stable state by receiving the local Interprocessor Communication (IPC) "stop" (block 200).
2. IPCs to the two processors are disabled either by locking up both global and local IPCs or by software convention, such as assuring that nothing will generate an IPC (block 202).
3. The processor ID of the Primary-Elect crossbars is set to the selected value for the Primary/Shadow pair (block 204).
4. The Processor ID in the Shadow-Elect crossbars is set to match the processor ID of the Primary-Elect processor (block 206).
5. The logical module ID of the Primary-Elect crossbars is set to the selected value for the Primary/Shadow pair (block 208).
6. The logical module ID in the Shadow-Elect crossbars is set to match the logical module ID of the Primary-Elect crossbars (block 210).
7. The crossbars in the Shadow-Elect module are marked as Shadows (local register state bit, block 212).
8. The crossbars in both the Shadow-elect and Primary-Elect modules are set to use logical module ID for arbitration (local register state bit, block 214).
9. The crossbars in both the Primary and Shadow Modules are marked as married (local register state bit, block 216). The married bit implies that the crossbars will use the logical module ID for address recognition. The crossbars are now aware that they have been bound together as a Primary/Shadow pair (required for recovery).

NOTE: At this point in the synchronization sequence the crossbars in the two modules will respond in lock step to any local access or IPC. (Shadow and Primary crossbars use the logical node ID for recognition.)

10. One crossbar is sent a Clear PU command (local register access, block 218). This synchronizes the Primary and Shadow processors (primary and shadow crossbars will have responded in lock step to the clear PU command), the processors are now operating in lock step.
11. A local IPC is sent to this processor ID. This resets the processor pair (block 220).
12. A local "start up" IPC is sent to this processor ID (block 222). This causes the processor pair to read in their processor ID from the crossbars and then requalify all processor information. (NOTE: This requalification is done by a single logical processor, not two independent processors.) The processor will then respond to whatever command was placed in the local communication segment (Stop, Dispatch, etc). The two modules are locked together and operating as a Primary/Shadow pair. These two physical modules have been blended into a single logical unit. There is no independent access to the physical modules.
13. The number of processors in the system (used for broadcast IPC) is reduced by one (block 224).
14. The IPCs in both processors are enabled (block 226).

Coordinated Operation

The Redundant Module tracks the operation of the Active Module by monitoring the MACD bus and arbitration lines. Because the Redundant Module is operating in lock step with the Active Module, and the arbitration lines are bused to all modules, the Redundant Module can follow the arbitration sequence and determine exactly when the Active Module will use the bus. Once a bus request has been initiated, the Redundant Module tracks the response using the memory bus pipeline protocol. This tracking is done by position in the arbitration queue and bus pipeline only. It does not involve any checking of bus address, control, or data fields.

Active Module/Redundant Module

The Primary and Shadow Modules alternate playing the role of Active and Redundant Module. At any point in time one module is active and one is redundant. The Primary Module starts out as the Active Module. The roles are reversed after each bus transmission from this module. Thus, the roles of Active/Redundant Module are switched after each memory request, or reponse, or bus blurb. A bus transmission consists of arbitration, bus transmission, and error reporting. The retry of an access is always done by the same module which originally made the bus transmission.

Error Detection

The Active Module has all of the normal error detection mechanisms enabled. Error detection and reporting is identical to those mechanisms used in nonshadowed systems.

The Redundant Module has all of its error-detection mechanisms *disabled* except for three. The three mechanisms are:

1. RQ
2. NREQ

3. MBOUT

This mechanism is always active because it is required to guarantee that a failure in the Redundant Module can't propagate into other confinement areas.

If the Active Module dies (both Master and Checker), the Redundant Module will hang up waiting for a bus message. This is permissible because this condition represents a double fault (both Master and Checker).

Deactivating Shadow Operation

Figure 9:
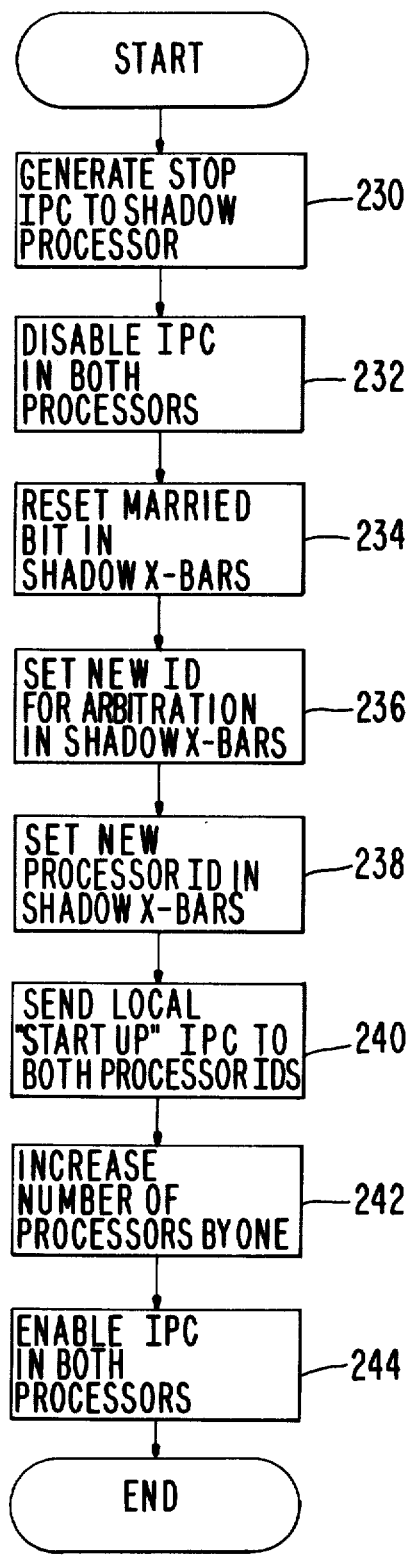
FIG. 9 is a flow diagram of the deactivating process for deactivation of shadow operation of a GDP module pair shown in the data processing system of FIG. 1.

Under error conditions, this operating is carried out by the hardware recovery mechanisms, described subsequently. To deactivate a shadow pair without an error, the following steps shown in FIG. 9 are taken:

1. The shadowed processor is stopped in a stable state by the "stop" local IPC (block 230).
2. IPCs to the processor are disabled either by locking up both global and local IPCs or by software convention (block 232).
3. The married bit in the shadowed crossbars is reset (block 234). This gives the two sets of crossbars unique local address spaces. However, they still have a single arbitration ID (logical module ID).
4. Assign the previous shadow crossbars a new logical module ID for use in arbitration, and reset the shadow bit (block 236).
5. Assign a new Processor ID in the previous shadow crossbars (block 238).
6. A local "start-up" IPC is sent to both processor IDs (block 240). The start-up IPC causes the processor ID to be read in from the crossbars, and then all processor information is requalified.
7. The number of processors in the system (used for broadcast IPC) is increased by one to account for the freed processor of the pair (block 242).
8. The IPCs in both processors are enabled (block 244).

IP Module Shadowing

On the central system side (i.e., crossbar interface), IP module shadowing is identical to GDP module shadowing. On the attached processor (AP) side, the following steps are required to initiate Shadow operation.

Start-up
1. The AP identifies one IP as the Primary and the other as a Shadow.
2. The first Clear PU command sent to the processors informs the external IP:AP interface logic that it is now married. (Primary generates outputs.)

Coordinated Operation (on the AP side)

The primary IP is responsible for all data transmission to the AP. Both IPs receive data from the AP.

Error Detection (at the IP:AP interface)

The error detection is done locally between each Master and Checker pair. Shadowing does not have any affect on the detection mechanisms at the AP:IP interface. An error detected at the AP:IP interface is signalled to the AP via HERROUT. Any switching of primary shadow responsibilities is initiated by the AP. If the crossbars detect an error situation which requires stopping one processor for recovery purposes, they signal Clear PU to the IP and the IP:AP interface logic. The interface logic utilizes this signal to switch the active IP:AP interface to the IP module which will continue operation (a change in the interface will only occur if the Shadow must take over for the primary).

Deactivating Shadow Operation

On the central system side of the module, the operation is identical to the GDP module. On the IP:AP interface, the Shadow connection is more permanent. The AP may change the Primary/Shadow designations of the modules, but both modules are connected over a single link to the AP. Thus only one module may be active at any time—there is no mechanism for allowing multiple IPs to attach to a single AP via a single link.

Memory Modules

Start-up
1. The two MCUs involved are stopped in a stable state.
2. The two memory arrays are cleared. Alternatively, the contents of the Primary-Elect array could be copied into corresponding locations in the Shadow-Elect array.
3. The Shadow-Elect MCU is marked as a shadow.
4. The memory address of the shadow MCU is changed to match the address range of the primary MCU.
5. The two MCUs are each marked as married.

The two modules are now locked together and operating as a Primary/Shadow pair. These two physical modules operate as a shadow pair only for memory array accesses. They retain distinct local address ranges, and may be accessed independently.

Coordinated Operation

The memory modules do not operate in strict lock step. The memory bus messages provide the mechanisms for tracking and coordination. Memory requests contain a full address field, and the responses from the memory follow a strict FIFO ordering. The active module is responsible for generating the reply message. The redundant module updates its array and RMW lock as required by the operation.

The memory modules switch active-redundant roles in the same "ping-pong" manner as the GDP modules—that is, the modules alternate handling memory requests. This alternation implies that two successive accesses will never be handled by one module. It is this fact which releases the MCUs from strick lock-step operation. This allows refresh and ECC correction to proceed independently in the two modules. The ping-pong operation only refers to memory operations. Local accesses to the MCUs do not have any impact on the active/redundant roles.

Error Detection

As with the GDP modules, error detection is carried out primarily by the Active Module. The Redundant Module keeps all of its array detection active (array FRC and ECC) as well as RQ and MBOUT FRC.

Deactivating Shadow Operation
1. The memory space is deallocated from software operation.
2. The two MCUs are stopped in a stable state.
3. The MCUs have the married and shadow bits cleared.
4. The previous shadow MCU has its address range changed to a new, unique range.

Because of the interleaved mode of operation of the memory system, shadowing may actually involve groups of modules. These groups each represent a block of contiguous memory locations.

Physical Constraints Imposed by Redundancy

The primary and back-up resources are constrained to have no components or signals in common. This constraint will have its major impact in the areas of bus interfaces. These interfaces can not be shared by the primary and backup resources. The MCU is an exception to this rule and thus requires special error-report messages and recovery procedures.

These physical constraints segment the machine into reconfiguration areas. The minimum reconfiguration area is a confinement area. The reconfiguration areas are based on the confinement areas, which are expanded to include the interfaces between two confinement areas. The reconfiguration areas are listed below:

GDP reconfiguration area: GDP and crossbars
IP reconfiguration area: IP, crossbars, and IP:AP interface logic
Memory reconfiguration area: Array, MCU, and Array:MCU interface logic
Memory bus reconfiguration area: crossbars, MCUs, interfacing logic, signal lines.

These reconfiguration areas form the minimum repair area. The repair areas are based on the reconfiguration areas, which are expanded to match the physical partitioning and equipment practice rules of the implementation.

Recovery

Whenever an error has been reported in the central system, the hardware will attempt to recover from the error. The recovery procedures work from the following information about the error:
1. The location at which the error was detected.
2. The type of error which was detected.
3. The redundancy that is available in the system.

This information is available to the nodes in the system via the error-reporting matrix and state information held in the node. Each node executes its recovery algorithm independently based on its local information (error report log, its physical node ID, showing status, and backup bus status).

Transient Errors

All transient errors are handled in the same manner independent of the type of error. The first report of an error is labeled as a transient (except for UNSAFE MODULE and UNCORRECTABLE ECC errors, which are always treated as permanent errors). If the same error is reported again during the subsequent retry, then the error is labeled as permanent.

Redundancy Required

All crossbars must have their retry buffers enabled.

Global Recovery Operation

The transient recovery procedure is separated into three parts. The first part is a time delay. This delay is used to allow the error condition to subside before the accesses are retried. All nodes (crossbars and MCUs) on all buses enter this time-delay phase in lock step upon the completion of the reporting cycle. This synchronization is achieved by using the last bit of the final BERL message (Sequence bit equals 1—propagation) to indicate the beginning of the time-out period.

The second phase of transient recovery consists of retrying all of the accesses not completed at the time of the error report. These accesses are reordered so that all of the outstanding writes (including RMW-W) are performed before any reads are performed. This sequence of accesses guarantees that all data structures will be consistent before any data is read from the system. The accesses are NOT guaranteed to be performed in their original order. Any processor request (ACD bus) which occurs during the time-delay interval will be performed along with the accesses which are retried.

Some special consideration of RMW is required before entering retry. If nothing special was done, a RMW-R (MMA) could be locked out by the lock which it set just before retry (similar problems occur for RMW-W). The crossbar and MCU both follow the same delay conventions (three cycles) after the completion of a message before actually performing the locking operation. Thus, the MCU will only lock (unlock) the RMW lock if the crossbar will inform the processor that the operation was successfully completed. For MMAs some extra signaling is required because the crossbar cannot immediately inform the processor that the operation has completed. This signaling is done using the MMA lines which run between crossbars on a processor module. If retry occurs after part of a MMA has completed, that part of the access will be retried as a normal (read or write) access. This guarantees correct operation during retry as well as bus switching during recovery.

Listed below is the specific sequence of steps which are carried out by each crossbar during retry.
1. Each node starts a time-out counter. All nodes remain quiescent until the counter reaches zero.
2. At this time the crossbars clear their time ordered queues and the RMW queue. The MCUs do NOT change the state of their RMW locks. The MCUs switch to STAGED mode of operation. In this mode of operation the MCU checks for correct ECC before returning a reply on the memory bus. Correctable ECC errors are logged in the MCU's ECC log, but they are not reported, and corrected data will be returned.
3. During reordering, all pending requests are placed in the time-ordered queues. A pending request is defined as any request which was not completed when the first error-report start bit reached this node, or any request which was initiated by the processor and would have resulted in a NREQ-OUT after the beginning of error reporting. Note that a request which entered normally on the reorder cycle will be handled along with the retried accesses. Any requests which happen after this time slot are queued in normal time-ordered fashion behind the retry writes and reads. Internally the crossbars assign their retry request to slot zero if it is a write, and slot one if it is a read. The next NREQ# will be assigned to slot two. The retry requests are entered into the time-ordered queue without any external signaling (NREQOUT).
4. The retry phase of recovery has now been completed. Memory-bus accesses will be handled in the normal manner as specified by the time-ordered queues and the priority arbitration network.

The third and final phase of transient recovery is the permanent error-reporting window. At the same time as the time-ordered queues are being flushed, the time-out counters in all the nodes are set a second time. Any error which is reported (i.e., enters the delay phase of recovery) before this time-out has been completed, is a potential permanent error. When the time-out has completed, normal operation resumes. The time-outs in all nodes will complete simultaneously. In this context, normal operation means that the time-out counter will be used as a pipeline time-out, and that error reports will be considered as transient errors (except for DAMAGED MODULE and UNCORRECTABLE ECC) and MCU operates unstaged.

Operation without Required Redundancy

If the crossbars do not have their retry buffers enabled, then transient error recovery is not possible. In these cases, the crossbars will assert ACD-Bus Error to the processor upon receiving any error-report message.

This mode of operation will be used by the customer who is not interested in fault tolerance. The anticipated system configuration would be:

| | |
|---|---|
| Crossbar | Retry buffers disabled. Parity checking enabled. |
| MCU | Enable staged mode of operation (check ECC before returning data on the bus) to allow single-bit ECC correction before data transmission on the bus. Parity checking on the memory bus and ECC checking on the array are enabled. |

This system configuration will detect parity errors on the memory buses and ECC errors in the memory arrays. The system will be able to continue operation in the presence of correctable ECC errors, but all other detected errors may potentially cause a system crash.

Permanent Errors

Permanent errors are handled during the time-delay part of the transient error-recovery procedure. The first step in recovering from a permanent error is to deactivate the reconfiguration area in which the error occurred. The second step is to reconfigure around the deactivated area using the backup resources in the system. The recovery sequence for each of the error types is listed below.

ERROR: BERL ERROR

Required Redundancy: Backup memory bus (OK to reconfigure).
Global Recovery Operation:
1. Deactivate faulty reconfiguration area:
   All crossbars on this bus (P-bus=R-bus) enter Register-Access-Only Mode (RAOM) of operation. In RAOM, MCUs and crossbars only respond to accesses to their local registers. Both memory address ranges in the crossbar are disabled, the memory address range of the MCU is disabled, but the local register address space remains enabled in the nodes. Accesses from the processor which use the "my crossbars" address space will be handled entirely within the module (no dummy memory bus transaction). In RAOM, error-report propagation is also disabled. Any error detected by a node in RAOM is reported as a Module/Bus error.
2. Reconfigure around isolated area:
   All MCUs on the faulty bus (P-bus=R-bus) switch to the backup bus (invert BUSSEL, P-bus:=B-up-bus, OK to reconfigure:=false, and MOVED:=true). All crossbars on the backup bus (Bup-bus=R-bus) enable address recognition for the memory address ranges for both buses (enable normal and backup, and NOT OK to reconfigure)

Operation without Required Redundancy: (NOT OK to reconfigure).
Deactivation is expanded to include the MCUs on the faulty bus. All MCUs on the faulty bus (P-bus=R-bus) enter RAOM.

MERL ERROR

Required Redundancy: Shadow Module (Married).
Global Recovery:
1. Deactivate faulty reconfiguration area:
   All crossbars in this module (P-mod=R-mod) enter RAOM. This error can only occur on processor modules because memory modules do not have MERL.
Reconfigure around isolated area:
   All crossbars in the spouse (primary or shadow) module (S-mod=R-mod) become active full time (not married).

Operation without Required Redundancy: (NOT married).
Deactivation occurs, but no reconfiguration is possible.

UNSAFE MODULE

Required Redundancy: Shadow module (married).
Global Recovery:
1. Deactivate faulty reconfiguration area:
   The MCU in this module (P-mod=R-mod) enters RAOM.
   This failure can only occur in memory modules.
Reconfigure around isolated area:
   The MCU in the spouse module (S-mod=R-mod) becomes active full time (NOT married).
Operation without Required Redundancy: (NOT married). Only deactivation occurs.

MODULE ERROR

Required Redundancy: Shadow module (married).
Global Recovery:
1. Deactivate faulty reconfiguration area:
   All crossbars (or MCU) in this module (P-mod=R-mod) enter RAOM (OFF state).
Reconfigure around isolated area:
   All crossbars (or MCU) in the spouse module (S-mod=R-mod) become active full time (NOT married).
Operation without Required Redundancy: (NOT married).
Deactivation occurs as before, reconfigureation is not possible.

BUS ERROR

Required Redundancy: Backup bus (OK to reconfigure)
Global Recovery Operation:
1. Deactivate faulty reconfiguration area:
   All crossbars on this bus (P-bus=R-bus) enter Register Access Only Mode (RAOM) of operation.
2. Reconfigure around isolated area:
   All MCUs on the faulty bus (P-bus=R-bus) switch to the backup bus (invert BUSSEL, P-bus:=B-up-bus, OK to reconfigure:=false, MOVED:=-true).
   All crossbars on the backup bus (Bup-bus=R-bus) enable address recognition for the memory address ranges for both buses (enable normal and backup, and NOT OK to reconfigure).

All MCUs on backup bus (Bup-bus=R-bus) OK false).

Operation without Required Redundancy: (NOT OK to reconfigure).

Deactivation is expanded to include the MCUs on the faulty bus. All MCUs on the faulty bus (P-bus=R-bus) enter RAOM.

UNCORRECTABLE ECC

Required Redundancy: Show module (married).
Global Recovery:
 1. Deactivate faulty reconfiguration area:
    The MCU in this module (P-mod=R-mod) enters RAOM.
    This failure can only occur in memory modules.
 Reconfigure around isolated area:
    The MCU in the spouse module (S-mod=R-mod) becomes active full time (NOT married).
 Operation without Required Redundancy: (NOT married). Only deactivation occurs.

CORRECTABLE ECC

This error can never occur as a permanent error. During the retry operation, MCUs run in STAGED mode, thus correcting the error before it is returned on the bus. Accesses which cause ECC errors during retry are handled in the same manner as scrubbing accesses (i.e., they are only reported if the ECC log is empty). This means that a correctable ECC error can never be reported twice, thus it can never be considered as a permanent error.

MODULE/BUS

Required Redundancy: Shadow module and backup bus (OK to reconfigure and Married).
 Global Recovery:
 1. Deactivate faulty reconfiguration area:
    All crossbars (or MCU) in this module (P-mod=R-mod) enter RAOM.
    All crossbars on this bus (P-bus=R-bus) enter RAOM.
 Reconfigure around isolated area:
    All MCUs on this bus (P-bus=R-bus) switch to the backup bus (P-bus:=Bup-bus, BUSSEL:=not BUSSEL, OK to reconfigure:=false, and MOVED:=true).
    All crossbars on the backup bus (Bup-bus=R-bus) enable address recognition for the memory address ranges for both buses (enable normal and backup, and NOT OK to reconfigure).
    All crossbars in the spouse module (S-mod=R-mod) become active full time (not MARRIED).
 Operation without Required Redundancy: NOT OK to reconfigure and NOT MARRIED.

Deactivation is the same as before plus all MCUs on this bus (P-bus=R-bus) enter RAOM. There is no reconfiguration. If only partial redundancy exists (either backup bus or shadow module), then that part of reconfiguration will occur.

BERL TEST

Required Redundancy: Backup bus (OK to reconfigure).
 Global Recovery Operation:
 1. Deactivate faulty reconfiguration area:
    All crossbars on this bus (P-bus=R-bus) enter Register Access Only Mode (RAOM) of operation.
 2. Reconfigure around isolated area:
    All MCUs on the faulty bus (P-bus=R-bus) switch to the backup bus (invert BUSSEL, P-bus:=Bup-bus, OK to reconfigure:=false, and MOVED:=true).
    All crossbars on the backup bus (Bup-bus=R-bus) enable address recognition for the memory address ranges for both buses (enable normal and backup, and NOT OK to reconfigure).
 Operation without Required Redundancy: (NOT OK to reconfigure).

Deactivation is expanded to include the MCUs on the faulty bus. All MCUs on the faulty bus (P-bus=R-bus) enter RAOM.

MERL TEST

Required Redundancy: Shadow module (married).
Global Recovery:
 1. Deactivate faulty reconfiguration area:
    All crossbars (or MCU) in this module (P-mod=R:mod) enter RAOM.
 Reconfigure around isolated area:
    All crossbars (or MCU) in the spouse module (S-mod=R-mod) become active full time (NOT married).
 Operation without Required Redundancy: (NOT married).

Deactivation occurs as before, reconfiguration is not possible.

INTERCHANGE BUS

Required Redundancy: Backup bus (OK to reconfigure).
 Global Action Reconfiguration:
    All crossbars on this bus (P-bus=R-bus), and the backup bus (Bup-bus=R-bus) invert their normal and backup participation logic enable bits. This means that all crossbars on these two buses will be working with their backup participation logic. Reset error count field.
 Operation without Required Redundancy: Not OK to reconfigure. ATTACH BUS:

Required Redundancy: Backup bus potential.
 Global Action Reconfiguration:
    All the crossbars on this bus (P-bus=R-bus) enable their normal participation logic, and set OK to reconfigure.
    All the crossbars on the backup bus (Bup-bus=R-bus) disable their backup participation logic and set OK to reconfigure.
    All the MCUs on the backup bus (Bup-bus=R-bus) set their OK to reconfigure flags.
    All MCUs on the backup bus (Bup-bus=R-bus) which originally were on bus being attached (MOVED flag set), switch to the newly attached bus (P-bus:=R-bus, BUSSEL:=not BUSSEL, MOVED:=false).
 Operation without Required Redundancy: If this bus is already attached, or there is no backup bus defined for the new bus, then this report will cause no action.

DETACH BUS

Required Redundancy: Backup bus (OK to reconfigure).
 Global Action Reconfiguration:
    All MCUs on this bus (P-bus=R-bus) switch to the backup bus (invert BUSSEL, P-bus:=Bup-bus, OK to reconfigure:=false, and MOVED:=true).

All crossbars on the backup bus (Bup-bus=R-bus) enable address recognition for the memory address ranges for both buses (enable normal and backup, and NOT OK to reconfigure).

All crossbars on this bus (P-bus=R-bus) enter RAOM.

Operation without Required Redundancy: (Not OK to reconfigure).

The bus which was detached will be removed from the system. The action will be exactly the same as if a permanent error had just occurred on the bus.

Description of Node Logic

The structure of a node is shown in FIG. 10. It is comprised of a fault-handling machine (400), bus interface logic (402), MACD interface logic (404), and switching logic (406). An MCU node is similar and is shown in FIG. 4.

ACD Interface Logic (402) and Memory (MACD) Interface Logic (404)

A description of logic for connecting to the ACD bus and to the memory bus can be found in copending application Ser. No. 972,007, of Daniel K. Jackson entitled "Microprocessor Interface Control Apparatus," filed on Dec. 21, 1981, and assigned to the assignee of the present application. In particular, connection to the ACD bus is shown in FIG. 5 thereof and connection to the memory bus is shown in FIG. 6 thereof. MCU node interface logic to the SLAD bus depends upon the particular array logic used.

Switching Logic (406)

Electronic switching logic for connecting and disconnecting a plurality of lines is well known in the prior art. For example, see U.S. Pat. No. 3,851,286, which issued to William F. Beausoleil on May 25, 1971.

Fault-Handling Machine (400)

The fault-handling machine is shown in more detail in FIG. 11. The MCU and crossbar fault-handling machines are similar in structure. The more complex crossbar fault-handling machine is described in detail. Because the MCU node does not connect to a MERL, the MCU fault-handling machine does not use the MERL receivere (132) and propagator (136). The following signals interface with the Fault-Handling Machine:

| | |
|---|---|
| BERL/MERL: | To and from the error-reporting matrix |
| Start Recovery: | An interrupt that tells the other parts of the machine to enter their recovery sequences. |
| Recovery-in-Progress: | State information available to other parts of the chip. |
| Start T.O.: | Initiates the pipeline time-out. This time-out is used to control parts of the recovery sequence. Proper operation of the time-out counter is checked as part of the recovery operation. |
| Start Retry: | A signal that informs the MACD arbitration unit to begin the request sequence for retrying any access that was pending when the recovery sequence began. |
| Recovery Done: | Signals the return to normal operation. |
| T.O. Done: | Indication that the pipeline timer has timed out. |
| Error Log: | This register is accessable via local access reads and writes. |
| Recovery RQ: | This signal goes to the MACD RQ signal. This signal is used to synchronize the action of all the nodes on one bus. |
| 1+RQ/2+RQ: | These signals are used to synchronize the action of all the nodes on one bus. |
| Test Commands: | These commands allow exercising some of the facilities that are not used as part of normal operation. |
| Node ID: | Used in determining recovery action (compared to the ID in the error report message), and for determining the ID field in an error-report message originating at this node. |
| Errors Detected: | The inputs from all the detection circuits. These signals are latched inside the fault handling machine. |

The fault-handling machine (400) is comprised of a BERL receiver (130) and a MERL receiver (132) which receive signals over the BERL (108) and the MERL (106). Connected to these receivers are a generator-state machine (134), a propagator-state machine (136), and a logger (138). A recovery machine (140) is connected to the generator (134), propagator (136), and logger (138).

The receivers (130, 132) receive error messages over the error-report lines (108, 106). The generator (134) receives errors detected at this node and test commands, and generates an error report on the BERL (108). The propagator (136) receives error-report messages from the error-report lines (106, 108) and propagates these messages over the BERL (108). The receipt of an error-report messages also starts the recovery machine (140). The logger (138) records information about the detected errors. The following sections describe in detail the operation of each of these units with reference to the flow charts and state diagrams of FIGS. 12-17.

Whenever an error is detected in the central system lines (133), the detecting node crosspoint switch reports the error occurrence to all the other nodes in the system. An error report generated by the generator (134) describes the type of error which occurred and the node ID (135) of the node which detected the error. An error-report message is broadcast over the reporting network matrix (MERL 106; BERL 108). This message is uniformly logged in the logger (138) of each crosspoint switch throughout the system, including the node that detected the error. Each node then begins the recovery process.

The node detecting the error sends an error-report message along its BERL bus. All nodes on this bus terminate operation upon receiving the start bit in the error message.

After the complete error report message has been received over BERL by receiver (130), the propagator (136) rebroadcasts the message on MERL (106). This informs the crosspoint switches on other buses that an error has occurred. All nodes stop operation upon receiving the start bit of the error-report message.

All nodes in the system now know about the error. After receiving the complete error-report message over MERL, the propagator (136) rebroadcasts the message (the report message from MERL) over its BERL. This informs all nodes (MCUs and crosspoint switches) of the error which is to be logged.

Whenever an error has been reported in the central system, the recovery machine (140) will attempt to recover from the error. The following is known about the error: the location at which the error was detected, the type of error which was detected, and the redundancy that is available in the system. This information is available to the nodes in the system via the error-reporting matrix and state information held in the node. The recovery machine in each node executes its recovery algorithm independently based on its local information (error report log, its physical node ID, showing status, and backup bus status).

Logical Flow Charts

Global Recovery (FIG. 12)

This flow chart represents an overview of system recovery without regard to which components perform which functions. The recovery algorithm is entered upon receiving an error report message, and the not NOT being in Register Access Only (block 250).

1. Hold off any new ACD bus requests. ALL crossbars assert ISB independent of address of request (block 252).
2. Wait for the system to stabilize (block 254). This time delay allows transient errors to subside. Bus switching and module switching occur during this time.
3. Clear out invalid report messages (block 256). If the previous report was garbled (parity error), this is reported at this time. This report is delayed because the report lines may be affected by the same noise burst which caused the error in the normal signal paths.
4. Retry pending accesses (block 258). All pending accesses are retried. The only ordering imposed on these requests is that all write accesses be complete before any read access is made.
5. Wait for retry to complete (block 260). It is important to note that ALL crossbars on an ACD bus are holding off new ACD bus requests (asserting ISB). This means no processor is released until the last bus has completed retry. At that time all processors are released simultaneously. Thus, indivisibility is preserved across all accesses that occur after the retry operation was initiated.
6. Resume Normal Operation: Release the ACD bus (block 260) and begin handling the processor requests which were initiated after retry began.

Error Reporting (FIGS. 13-17)

Assumptions:
1. Neither BERL or MERL may be broken during reporting.
2. Transient errors may be present during reporting, but they will be detected by parity.

Faults Detected During Error Reporting:
1. Parity on BERL or MERL.
2. BERL or MERL TEST errors (broken line or bad driver).

Response to faults detected during reporting:
Any node detecting parity on BERL or MERL:
  Sets ERR parity
  Logs Report Error error types
  Retransmits Report Error ERR message if appropriate
Any Node receiving Report Error ERR message:
  Logs the message
  Retransmits Report Error ERR message if appropriate
Any Node with parity flag set at end of reporting:
  Transmits a Report Error ERR message NOTE: Report Errors are never regarded as permanent faults.
ERR message transmission:
MERL has precedence over BERL
MOD has precedence over BUS error type
Crossbar transmission:
BERL (original error report)
MERL
BERL
MCU transmission:
BERL (original error report)
Crossbar Recovery Algorithm (See FIG. 13)
DO
Begin
  Wait for ERR_Start
  Enable_T.O._Error_Detection-False
  Send (Start Recovery)
  Recovery_RQ-1
  Start T.O.
  Wait for T.O. Done
  Send (Reporting Done)
  Start T.O.
  IF permanent bit=permanent Then Begin
    (PERM)
    Set alarm IPC bit
    IF ID=mine Then
    Begin
      Case of Error Type
      Bus: IF ID=my_backup and OK_to_reconfigure Then enable backup configuration
      Module: IF ID=my_partner Then Married-False
      Else: Do_nothing
    End
  Else set dormant access mode
  End (PERM)
  Wait for T.O. OR NOT 2+
  IF NOT 2+ Then
  Begin
    Enable_T.O._Error_Detection-True
    Wait for T.O.
    Enable_T.O._Error_Detection-False
  End
  Recovery_RQ-0
  Wait for (NOT 1+) AND (NOT 2+)
  Send (Start_Retry)
  Wait for empty pipe
End
Until Forever
Receiver Algorithm (See FIG. 14)
DO
Begin
  Wait for message to start
  ACTIVE-TRUE
  BUSY-TRUE
  BUF-MESSAGE INPUT
  IF BUF.ERROR_TYPE=Illegal message THEN
  Begin
    BUF.ERROR_TYPE-Illegal_Replacement_Type
    BUF.ERROR_LOC-NODE_ID
  End
  IF Parity Bad THEN
  Begin
    Enable Parity Error Detected
    Buf.Error_Type-Report_Error_Type
    Buf.Error_Loc-0
  End

```
Busy-False
Parity_Bad-False
Send ERR_Buf (to logger and propagator)
END
Until Forever
Generator Algorithm (see FIG. 15)
DO
Begin
   Wait for Error_Detection_Flags=∅ OR
      Test_Detection_Command OR Test Flag=∅
   IF Test_Detection_Commnd THEN
      Begin
         CASE of Error_Detection_Flags
            All ones: Error_Detection_Flags-0
            Else: Error_Detection_Flags-Mod Error
      End
   IF Error_Detection_Flags=∅ THEN
      Begin
         IF Network_Active Then
            Begin
               Wait for Report Done
               Error_Detection_Flags.Normal-0
            End
         Else
            Begin
               IF NOT BERL_BUSY THEN
                  Transmit on BERL (Error_Detection_Flags
                     Test Flags, Node ID)
                  Error_Detection_Flags-0
            End
      End
Until Forever
NOTE: The test flags are treated separately from error-
detection flags so that a failure resulting from an ERR
driver will occur again during retry. Test flags are
cleared by Recovery Done.
Propagator Algorithm (See FIG. 16)
DO
Begin
   Wait for Err.Buf Ready
   IF Berl_Buf_Ready AND NOT Merl_Buf_Ready
      Then
      Begin
         IF NOT MERL_BUSY THEN Transmit Berl
            Buf_on Merl
         Wait for Merl_Buf_Ready
      End
   Wait for NOT BERL_BUSY
   Transmit Merl_Buf on Berl
   Wait for Report Done
   Berl_Buf_Ready-False
   Merl_Buf_Ready-False
End
Until Forever
Logger Algorithm (See FIG. 17)
DO
Begin
   Transient Loop: Wait for Buf_Ready OR Report_
      Done
   IF Buf_Ready Then
      Begin
         Check_ERR_Tests
         Log_it
         Loop back to Transient Loop
      End
   Record Loop: Wait for Buf Ready OR Report_Done
      OR Recovery_Done
   IF Buf_Ready Then
      Begin
         Check_ERR_tests
         Record_it
         Loop back to Record Loop
      End
   IF Report_Done Then
      Begin
         IF Log=Record Then
            Begin
               Log.Permanent_bit-True
            End
         Log-Record
         Loop back to Record Loop
      End
End
Until Forever
NOTE: Check ERR_tests: a procedure that checks for
bad MERL and
   BERL lines
Log_it: a procedure that puts BUF into Log Record_
   _it: a procedure that puts BUF into Record
The Check_ERR_tests are different for MCU and
crossbar
MCU Recovery Algorithm (See FIG. 13)
DO
Begin
   Wait for ERR_Start
   Enable_T.O._Error_Detection_False
   Send (Start Recovery)
   Recovery_RQ-1
   Start T.O.
   Wait for T.O. Done
   Send (Reporting Done)
   Start T.O.
   IF permanent_bit=permanent Then
   Begin (PERM)
      IF ID=mine Then
         Begin
            Case of error_type
               Module: IF ID=my_partner Then
                  Married-False
               Else: Do_nothing
         End
      Else
         Begin (my_ID)
            Case of error_type
               Bus: IF OK_to_reconfigure Then switch buses
               Module: set register access only mode
               Hard ECC: set fully buffered mode
               Else: Do_Nothing
         End (My_ID)
   End (PERM)
   Else
      Begin (Transient)
         IF ID=mine and Error_Type=hard ECC
            Then set fully buffered mode
      End (Transient)
   Wait for T.O. OR NOT_2+
   IF NOT 2+ Then
      Begin   Enable_T.O._Error_Detection-True
         Wait for T.O.
         Enable_T.O._Error_Detection-False
      End
   Recovery_RQ-0
   Wait for (NOT 1+) AND (NOT 2+)
   Delay 2 cycles
   Wait for empty pipe
End
```

Until Forever

While the invention has been particularly shown and described with reference to a preferred embodiment thereof, it will be understood by those skilled in the art that various changes in form and details may be made therein without departing from the spirit and scope of the invention.

What is claimed is:

1. In a data processing system in which a switching matrix provides electrical interconnections between horizontal MACD buses and vertical ACD buses connected in said matrix by means of nodes, a fault-handling mechanism comprising:

an error-reporting matrix including horizontal Bus Error Report Lines (BERLs) and vertical Module Error Report Lines (MERLs), said BERLs being associated with said MACD buses such that all nodes sharing an MACD bus are connected with a BERL, said MERLs being associated with said ACD buses such that all nodes sharing an ACD bus are connected with a MERL; and, error-reporting means connected at the intersection of one of said MERLs and one of said BERLs, said error-reporting means including receiving means connected to said MERL for receiving first error messages, said first error messages being transmitted over said one MERL, said error-reporting means further including propagating means connected to said receiving means and said one BERL, responsive to said receiving means for propagating second error messages over said one BERL to other error-reporting means located at said other nodes in said matrix.

2. The combination in accordance with claim 1 wherein said data processing system further includes memory means, said memory means including a memory control unit;

said memory control unit being connected to at least one of said BERLs and at least one of said MACD buses, said one MACD bus including data lines for carrying bits representing a data field and address lines for carrying bits representing an address field;

said memory control unit including address logic for registering said address field bits, data logic for registering said data field bits, and error detection means, said error detection means having inputs connected to said address logic and said data logic and an output connected to said MACD bus, said error detection means including means utilizing said data bits and said address bits for generating an error correcting code checksum on said output thereof, said checksum providing error detection for failures in said address lines as well as failures in said data lines; and means in said memory control unit connected to said address logic means and said data logic means, responsive to said error detection means output, for storing said data field and said checksum at a memory location in said memory means specified by said address field.

3. The combination in accordance with claim 1 further comprising:

a memory control unit;

said memory control unit being physically connected to two MACD buses, each bus having two BERL lines associated therewith;

said memory control unit including switching means for switching logical connection to said buses;

said memory control unit being logically connected, by actuation of said switching means by said memory control unit in response to an error or by external command, to only one selected MACD bus at a time, one MACD bus being denoted primary bus and the other MACD bus being denoted backup bus for said memory control unit;

said memory control unit including means for reporting errors on the two BERL lines associated with said selected bus;

said memory control unit including first logic means responsive to an error occurrence or a command for activating said switching means to switch buses in response to the detection of an error or in response to a command and, said memory control unit including second logic means for preventing the removal of more than one BERL from service, so that the loss of BERLs does not prevent errors from being correctly reported.

4. The combination in accordance with claim 1 wherein said error-reporting means further comprises: error detection means for detecting the occurrence of an error;

reporting means, connected to said error-detection means and to said BERL, responsive to the detection of an error, for sending an error-report message on said BERL;

first means, connected to said BERL, responsive to an error-report message received over said BERL, for rebroadcasting said message (the report message from BERL) on said MERL to thereby inform error-reporting means at other nodes of said error-reporting matrix that an error has occurred;

second means, connected to said MERL, responsive to the receipt of a complete error-report message over MERL, for rebroadcasting said message (the report message from MERL) over said BERL to thereby initiate the logging of an error at said other nodes; and, logging means connectd to said BERL, responsive to said error-report message for logging said error-report message.

5. The combination in accordance with claim 4 wherein said error-reporting means further comprises:

arbitration means, connected to said error detection means and responsive to the detection of simultaneous multiple errors, for determining which error will be logged throughout the system, said arbitration means including a primary arbitration mechanism which orders said errors on a first-come, first-served basis and a secondary arbitration mechanism which orders said errors by error types and node identification.

6. The combination in accordance with claim 5 wherein said primary arbitration mechanism further comprises:

first inhibiting means, connected to said BERL, for inhibiting the rebroadcast of an error-report message if another error-report message is in progress on an error-report line; and, second inhibiting means connected to said MERL and said BERL, activated upon the condition that error reports are received over said BERL and said MERL at the same time, for inhibiting the report on said BERL.

7. In a data processing system in which a switching matrix provides electrical interconnections between horizonal MACD buses and vertical ACD buses connected in said matrix by means of nodes, and in which a fault-handling mechanism provides an error-reporting matrix including horizontal Bus Error Report Lines (BERLs) and vertical Module Error Report Lines (MERLs), said BERLs being associated with said MACD buses such that all nodes sharing an MACD bus are connected with a BERL so that errors occurring in error confinement areas may be rebroadcast over one of said BERLs, said MERLs being associated with said ACD buses such that all nodes sharing an ACD bus are conneted with a MERL so that errors occurring in error-confinement areas may be reported over a corresponding one of said MERLs; error-report log means connected at the intersection of one of said MERLs and one of said BERLs comprising:

holding means connected to said MERLS and said BERLS for holding information from a most recent error-report message;

logging means connected to said holding means for logging error reports, said logging means including means for uniquely identifying said error reports so that said error reports are distinguishable as between the single occurrence of an error, and repeated occurrences of the same error; and, logic means connected to said holding means and said logging means for immediately updating said logging means upon te condition that an error-report message is received, said logic means including an error-count means, and means connected to said error-count means for incrementing said error count means upon the condition that the single occurrence of an error is reported.

8. The combination in accordance with claim 7 wherein said error-report log means further comprises:

means for read-accessing the log contents of said logging means at a first time and at a second time that is subsequent to said first time;

first means for storing said log contents of said logging means read at said first time to provide a previous log count field;

second means for storing said log contents of said loging means read at said first time to provide a current log count field; and, comparing means connected to said first and second means for comparing said previous count field stored in said first means with said current count field stored in said second means, said comparing means including means operative upon the condition that the count-field contents are identical, for indicating that no error has occurred, and operative upon the condition that the count-field contents are different, for indicating that a new error(s) has occurred, to thereby allow the identification of new errors without requiring that all logs in the system be cleared after each error occurrence.

9. In a data processing system in which a switching matrix provides electrical interconnections between horizontal MACD buses and vertical ACD buses connected in said matrix by means of nodes, and in which a fault-handling mechanism provides an error-reporting matrix including horizontal Bus Error Report Lines (BERLs) and vertical Module Error Report Lines (MERLs), said BERLs being associatd with said MACD buses such that all nodes sharing an MACD bus are connected with a BERL so that errors occurring in error-confinement areas may be reported over one of said BERLs, said MERLs being associated with said ACD buses such that all nodes sharing an ACD bus are connected with a MERL so that errors occurring in error-confinement areas may be rebroadcast over one of said MERLs; error-reporting logic testing means at one node connected at the intersection of one of said MERLs and one of said BERLs comprising:

test command receiving means connected to said MACD bus for receiving a test command;

said test command including means which identifies said one node as a node (tested node) to be tested, said test command being comprised of a read access request for read data from said one node, said read access request being directed to said one node (tested node) from another node (testing node) over said MACD bus; and, test logic means connected to said test command receiving means and to said MACD bus, responsive to said test command receiving means, for returning said read data to said testing node;

said test logic means including means for causing a known error condition to occur in said read data, thereby forcing an error at one of said confinement areas.

10. The combination in accordance with claim 9 wherein said test logic means further comprises:

means for generating an error report message on said BERL; and, wherein said testting node includes:

logging means at said testing node;

means at said testing node connected to said logging means at said testing node, for causing said error-report message received on said BERL to be logged in said logging means at said testing node; and, means at said testing node responsive to said logging means at said testing node, for reporting a module error upon the condition that said logged error-report message does not contain a reported error.

* * * * *